US 7,792,710 B2

(12) United States Patent
Bonner et al.

(10) Patent No.: US 7,792,710 B2
(45) Date of Patent: *Sep. 7, 2010

(54) METHODS OF INFLUENCING SHOPPERS AT THE FIRST MOMENT OF TRUTH IN A RETAIL ESTABLISHMENT

(75) Inventors: Brett Bracewell Bonner, New Richmond, OH (US); Christopher Todd Hjelm, Cincinnati, OH (US); Titus Arthur Jones, Hebron, KY (US); John Edward Osborne, II, Indian Springs, OH (US); Dion Brent Perkins, Cincinnati, OH (US); Gregory Michael Menz, Cincinnati, OH (US)

(73) Assignee: Sunrise R&D Holdings, LLC, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/609,246

(22) Filed: Oct. 30, 2009

(65) Prior Publication Data

US 2010/0049594 A1 Feb. 25, 2010

Related U.S. Application Data

(63) Continuation-in-part of application No. 12/353,817, filed on Jan. 14, 2009, and a continuation-in-part of application No. 12/353,760, filed on Jan. 14, 2009, and a continuation-in-part of application No. 12/408,581, filed on Mar. 20, 2009, and a continuation-in-part of application No. 12/172,326, filed on Jul. 14, 2008, now Pat. No. 7,672,876, and a continuation-in-part of application No. 12/058,705, filed on Mar. 29, 2008, and a continuation-in-part of application No. 11/859,703, filed on Sep. 21, 2007.

(60) Provisional application No. 61/110,202, filed on Oct. 31, 2008.

(51) Int. Cl.
*G06Q 30/00* (2006.01)
*H04L 12/56* (2006.01)
(52) U.S. Cl. ........................................ 705/26; 370/406
(58) Field of Classification Search ................. 370/406
See application file for complete search history.

(56) References Cited

U.S. PATENT DOCUMENTS 4,929,819 A 5/1990 Collins, Jr.

(Continued)

FOREIGN PATENT DOCUMENTS

CN 1953408 A 4/2007

(Continued)

OTHER PUBLICATIONS

Repas,Robert, "Industrial Sensing The Wireless Way," Jan. 6, 2005, Machine Design, v77n1, p. 104, 106, 108, 110.*

(Continued)

*Primary Examiner*—Amee A Shah
*Assistant Examiner*—Brandy Zukanovich
(74) *Attorney, Agent, or Firm*—Theodore P. Cummings, Esq.

(57) ABSTRACT

Provided herein are systems and methods for influencing shoppers while they consider making purchasing decisions in a retail establishment. Specifically, the systems and methods for influencing shoppers may occur during a shopper's first moment of truth by transmitting through a communication network one or more influential messages to a handheld wireless electronic device or intelligent shopping cart, which is in close proximity to a shopper during a shopping trip throughout a retail establishment.

19 Claims, 10 Drawing Sheets

U.S. PATENT DOCUMENTS

| | | |
|---|---|---|
| 5,294,781 A | 3/1994 | Takahashi et al. |
| 5,434,775 A | 7/1995 | Sims et al. |
| 5,630,071 A | 5/1997 | Sakai et al. |
| 5,825,002 A | 10/1998 | Roslak |
| 5,918,211 A | 6/1999 | Sloane |
| 5,995,015 A | 11/1999 | DeTemple et al. |
| 6,032,127 A | 2/2000 | Schkolnick et al. |
| 6,119,935 A | 9/2000 | Jelen et al. |
| 6,236,335 B1 | 5/2001 | Goodwin, III |
| 6,347,079 B1 | 2/2002 | Stephens et al. |
| 6,382,357 B1 | 5/2002 | Morrison et al. |
| 6,522,641 B1 | 2/2003 | Siu et al. |
| 6,587,835 B1 | 7/2003 | Treyz et al. |
| 6,659,344 B2 | 12/2003 | Otto et al. |
| 6,725,206 B1 | 4/2004 | Coveley |
| 6,820,062 B1 | 11/2004 | Gupta et al. |
| 6,837,436 B2 | 1/2005 | Swartz et al. |
| 6,879,574 B2 | 4/2005 | Naghian et al. |
| 6,895,330 B2 | 5/2005 | Cato et al. |
| 6,959,862 B2 | 11/2005 | Neumark |
| 7,006,982 B2 | 2/2006 | Sorensen |
| 7,076,441 B2 | 7/2006 | Hind et al. |
| 7,084,765 B2 | 8/2006 | Clapper |
| 7,089,020 B2 | 8/2006 | Asthana et al. |
| 7,167,799 B1 | 1/2007 | Dolgov et al. |
| 7,209,754 B2 | 4/2007 | Niu et al. |
| 7,240,834 B2 | 7/2007 | Kato et al. |
| 7,245,214 B2 | 7/2007 | Smith |
| 7,263,378 B2 | 8/2007 | Inselberg |
| 7,283,048 B2 | 10/2007 | Stilp |
| 7,301,455 B2 | 11/2007 | McKenna et al. |
| 7,309,009 B2 | 12/2007 | Singer-Harter |
| 7,343,317 B2 | 3/2008 | Jokinen et al. |
| 7,390,264 B2 | 6/2008 | Walker et al. |
| 7,416,123 B2 | 8/2008 | Saperstein et al. |
| 7,420,464 B2 | 9/2008 | Fitzgerald et al. |
| 7,443,295 B2 | 10/2008 | Brice et al. |
| 7,463,143 B2 | 12/2008 | Forr et al. |
| 7,475,813 B2 | 1/2009 | Swanson, Sr. |
| 7,503,477 B2 | 3/2009 | Johnson |
| 7,504,937 B2 | 3/2009 | McKenna et al. |
| 2001/0028301 A1 | 10/2001 | Geiger et al. |
| 2002/0002504 A1 | 1/2002 | Engel et al. |
| 2002/0161658 A1 | 10/2002 | Sussman |
| 2002/0174025 A1 | 11/2002 | Hind et al. |
| 2003/0171944 A1 | 9/2003 | Fine et al. |
| 2004/0111454 A1 | 6/2004 | Sorensen |
| 2004/0235468 A1 | 11/2004 | Luebke et al. |
| 2005/0080894 A1 | 4/2005 | Apostolopoulos et al. |
| 2005/0136944 A1 | 6/2005 | Misikangas et al. |
| 2005/0149391 A1 | 7/2005 | O'Shea et al. |
| 2005/0216339 A1 | 9/2005 | Brazell et al. |
| 2005/0246196 A1 | 11/2005 | Frantz et al. |
| 2006/0009152 A1 | 1/2006 | Millard et al. |
| 2006/0125356 A1 | 6/2006 | Meek, Jr. et al. |
| 2006/0149628 A1 | 7/2006 | Chefalas et al. |
| 2006/0186973 A1 | 8/2006 | Satou |
| 2006/0193262 A1 | 8/2006 | McSheffrey et al. |
| 2006/0200378 A1 | 9/2006 | Sorensen |
| 2006/0244588 A1 | 11/2006 | Hannah et al. |
| 2006/0266825 A1 | 11/2006 | Do et al. |
| 2006/0282334 A1 | 12/2006 | Kao et al. |
| 2006/0289637 A1 | 12/2006 | Brice et al. |
| 2006/0293779 A1 | 12/2006 | Nishri |
| 2006/0293968 A1 | 12/2006 | Brice et al. |
| 2007/0027612 A1 | 2/2007 | Barfoot et al. |
| 2007/0055563 A1 | 3/2007 | Godsey et al. |
| 2007/0061041 A1 | 3/2007 | Zweig |
| 2007/0063837 A1 | 3/2007 | McKenna et al. |
| 2007/0073554 A1 | 3/2007 | Flinn et al. |
| 2007/0094080 A1 | 4/2007 | Wiken |
| 2007/0106775 A1 | 5/2007 | Wong |
| 2007/0118429 A1 | 5/2007 | Subotovsky |
| 2007/0121598 A1 | 5/2007 | McGary |
| 2007/0138268 A1* | 6/2007 | Tuchman .................. 235/383 |
| 2007/0142061 A1 | 6/2007 | Taubenheim et al. |
| 2007/0152812 A1 | 7/2007 | Wong et al. |
| 2007/0192183 A1 | 8/2007 | Monaco et al. |
| 2007/0197881 A1 | 8/2007 | Wolf et al. |
| 2007/0210155 A1 | 9/2007 | Swartz et al. |
| 2007/0219866 A1 | 9/2007 | Wolf et al. |
| 2007/0239569 A1 | 10/2007 | Lucas et al. |
| 2007/0250613 A1 | 10/2007 | Gulledge |
| 2007/0293237 A1 | 12/2007 | Correal et al. |
| 2008/0025208 A1 | 1/2008 | Chan |
| 2008/0030319 A1 | 2/2008 | McKenna et al. |
| 2008/0032705 A1 | 2/2008 | Patel et al. |
| 2008/0040219 A1 | 2/2008 | Kim et al. |
| 2008/0040509 A1 | 2/2008 | Werb et al. |
| 2008/0042836 A1 | 2/2008 | Christopher |
| 2008/0056261 A1 | 3/2008 | Osborn et al. |
| 2008/0059297 A1 | 3/2008 | Vallier et al. |
| 2008/0074254 A1 | 3/2008 | Townsend et al. |
| 2008/0113614 A1 | 5/2008 | Rosenblatt |
| 2008/0147461 A1 | 6/2008 | Lee et al. |
| 2008/0170580 A1 | 7/2008 | Goldman et al. |

FOREIGN PATENT DOCUMENTS

| | | |
|---|---|---|
| JP | 02309494 | 12/1990 |
| JP | 2003223548 A2 | 8/2003 |
| JP | 2005309601 A2 | 11/2004 |
| JP | 2006011617 A2 | 1/2006 |
| JP | 2006309280 A2 | 11/2006 |
| KR | 4028108 A | 4/2004 |
| WO | WO-9914694 A1 | 3/1999 |
| WO | 2006137065 A2 | 12/2006 |
| WO | WO-2007085826 A1 | 8/2007 |

OTHER PUBLICATIONS

Chediak, Mark, "Retail Technology Grocers Get a Taste of Future; Store Owners Who Want to Stand Out in the Crowd These Days are Embracing Cutting-Edge Services," Jan. 21, 2006, Orlando Sentinel, p. C1.*

Gros, Michael, "Wireless POS Units Serve Up Profits to Hungry Companies," Aug. 2003, CRN, (1059), 93.*

* cited by examiner

METHODS OF INFLUENCING SHOPPERS AT THE FIRST MOMENT OF TRUTH IN A RETAIL ESTABLISHMENT

CROSS-REFERENCE TO RELATED APPLICATION

This application claims priority to U.S. Provisional Patent Application 61/110,202 filed on Oct. 31, 2008, U.S. Nonprovisional patent application Ser. No. 12/353,817 filed on Jan. 14, 2009, U.S. Nonprovisional patent application Ser. No. 12/353,760 filed on Jan. 14, 2009, and U.S. Nonprovisional patent application Ser. No. 12/408,581 filed on Mar. 20, 2009, U.S. Nonprovisional patent application Ser. No. 12/058,705 filed on Mar. 29, 2008, U.S. Nonprovisional patent application Ser. No. 12/172,326 filed on Jul. 14, 2008, U.S. Nonprovisional patent application Ser. No. 11/859,703 filed on Sep. 21, 2007, which are herein incorporated by reference in full.

FIELD OF THE INVENTION

The present invention relates to influencing a shopper while she shops within or about a retail establishment. Specifically, influencing a shopper's behavior includes influencing a shopper's purchase decisions at a shopper's first moment of truth by transmitting an influential message through a wireless communications multi-network to a wireless end device held in close proximity to said shopper during her shopping trip throughout the retail establishment.

BACKGROUND

Retailers are being squeezed. They are being squeezed by high commodity prices, high transportation costs, high labor costs, and the high cost of advertising inside and outside of their retail centers. Retailers now, more than ever, are having their profit margins decimated by events far beyond their control. Importantly, retailers, which control their own retail space, need to optimize use of that space in ways that include keen shopper understanding. Such shopper understanding is costly to obtain and is often incomplete. For example, the collection of shopper buying habits is known to be acquired at the point of sale. Such data collection is widespread but fails to provide granular insight as to a shopper's behavior, namely the reasons a shopper chooses a particular product for purchase. Today, other than following shoppers in a store with one or more persons skilled and trained at conducting focus group testing, the ability to gain shopper insights at the point of decision is lacking.

Grocery stores are among those hardest hit, since their profit margins are often no more than one to two percent of a store's total sales. Currently, stores boost their profit margins by selling shelf space within the store like real estate. To increase the price of shelf space in stores and to encourage a greater variety of products within stores, stores need to provide vendors of wholesale products with a more effective and influential way of selling their products to the store's shoppers. Stores need a way to offer vendors effective systems and methods to influence shoppers at the first moment of truth, allowing the vendors and retail establishments to sell more products. Vendors will pay premiums to stores employing such systems and methods.

Shoppers, too, are feeling the pinch of ever escalating commodity prices like crude oil, corn, and others. As a result, shoppers have become increasingly cost conscious of their monthly food bills. Yet, today's modern lifestyles do not provide shoppers the luxury of time to spend searching and cutting out coupons or other saving mechanisms typically offered by retailers. Therefore, shoppers need a way to make shopping easier, quicker and cheaper.

Currently, retailers attempt to influence shoppers before, during, and after a shopper's product consideration by advertising products within the retail establishment over the in-store speakers, through elaborate displays, fixed print advertisements attached to shopping carts, weekly circular ads provided to shoppers as they enter the store, and electronic tags located on shelves displaying products. These methods are inefficient and often result in higher costs to the store, which is passed on to the customers.

Therefore, what is needed is a low cost, highly effective and highly reliable in-store system for tracking, analyzing, and responding to a shopper's product decision-making. It is important that such systems and methods serve to enhance, simplify, and expedite a shopper's experience with very little, if any, cost pass-through to shoppers and very little, if any, negative impact to a store's profit margin. This has been achieved through one or more of the embodiments described below and will now be explained with greater detail and particularity.

SUMMARY

In an exemplary embodiment of the system of influencing a shopper's product selection during a shopper's shopping trip in a retail establishment, the following are present: (1) a communications multi-network positioned about said retail establishment; (2) a logic engine operatively connected to said communications multi-network, the logic engine managing said communications multi-network; and (3) a wireless end device positioned in close proximity to said shopper. The wireless end device collects product related information from said shopper, and is in tracked communication through said communications multi-network with the logic engine. The logic engine delivers an influential message, intended to influence the shopper's product selection, to the shopper's wireless end device.

In an alternative exemplary embodiment there is a system of influencing a shopper's product selection at a first moment of truth in a retail establishment that comprises several elements that will each be addressed in turn.

The first element this execution includes a communications multi-network positioned about said retail establishment. Second, a logic engine is operatively connected to said communications multi-network to organize and manage the communication of data over the communications multi-network. Third, products positioned about said retail establishment for purchase by said shopper have specified product locations of which the retail establishment is aware. Fourth, this execution includes a map of said retail establishment wherein a two-dimensional X and Y grid is juxtaposed on top of said map of said retail establishment to provide each element on said map of said retail establishment with a set of X and Y positional coordinates. Fifth, a product location map is provided, wherein the logic engine is aware of the majority of the locations of the products positioned about retail establishment. Sixth, a wireless end device is positioned in close proximity to said shopper.

In said execution, the wireless end device is operatively connected to a location tracking device which is tracked through said communications multi-network by the logic engine to produce a shopper location data. Moreover, the wireless end device is operatively connected to a product scanning device. The shopper scans each product intended for purchase with the product scanning device to create product selection data. Further, the wireless end device transmits the product selection data to the logic engine which then compares the product selection data for a single product selected by said shopper with said shopper location data collected at the time said product selection data was collected. This creates a shopper to product location ratio.

The logic engine examines the shopper to product location ratio, the product selection location data and the product selection data of said shopper to determine if said shopper experienced a first moment of truth. Then, the logic engine creates an influential message and delivers it through said communications multi-network to the wireless end device positioned in close proximity to said shopper. Finally, the influential message influences said shopper just before, at, or near said first moment of truth.

In an alternative exemplary embodiment there is a method of influencing a shopper's product selection during a shopper's shopping trip in a retail establishment. Said method comprises a first step of positioning a communications multi-network about a retail establishment. This communications multi-network includes a mesh communication network and a star communication network. Next, a logic engine is provided in operative connection with said communications multi-network. A wireless end device is provided to said shopper to be held in close position to said shopper during said shopper's shopping trip in said retail establishment. The wireless end device is in tracked communication with the mesh communication network of said communications multi-network. Next, the wireless end device is electronically associated to said communications multi-network. Then, the logic engine identifies a product on display in said retail establishment that is between about six inches and about ten feet from the shopper. Next, the logic engine determines an influential message to transmit to the wireless end device held in close proximity to said shopper and transmits the influential message to the shopper's wireless end device. In the exemplary embodiment, said shopper has the option to select that she does not want to receive influential messages to be sent to her wireless end device.

Further embodiments of the present invention, as well as the structure and operation of these embodiments of the present invention, are described in detail below with reference to the accompanying drawings.

BRIEF DESCRIPTION OF THE DRAWINGS

While the specification concludes with claims particularly pointing out and distinctly claiming the invention, the embodiments will be better understood from the following description in conjunction with the accompanying Figures, in which like reference numerals identify like elements and in which:

DESCRIPTION OF THE REFERENCED NUMERALS

Figure 1:
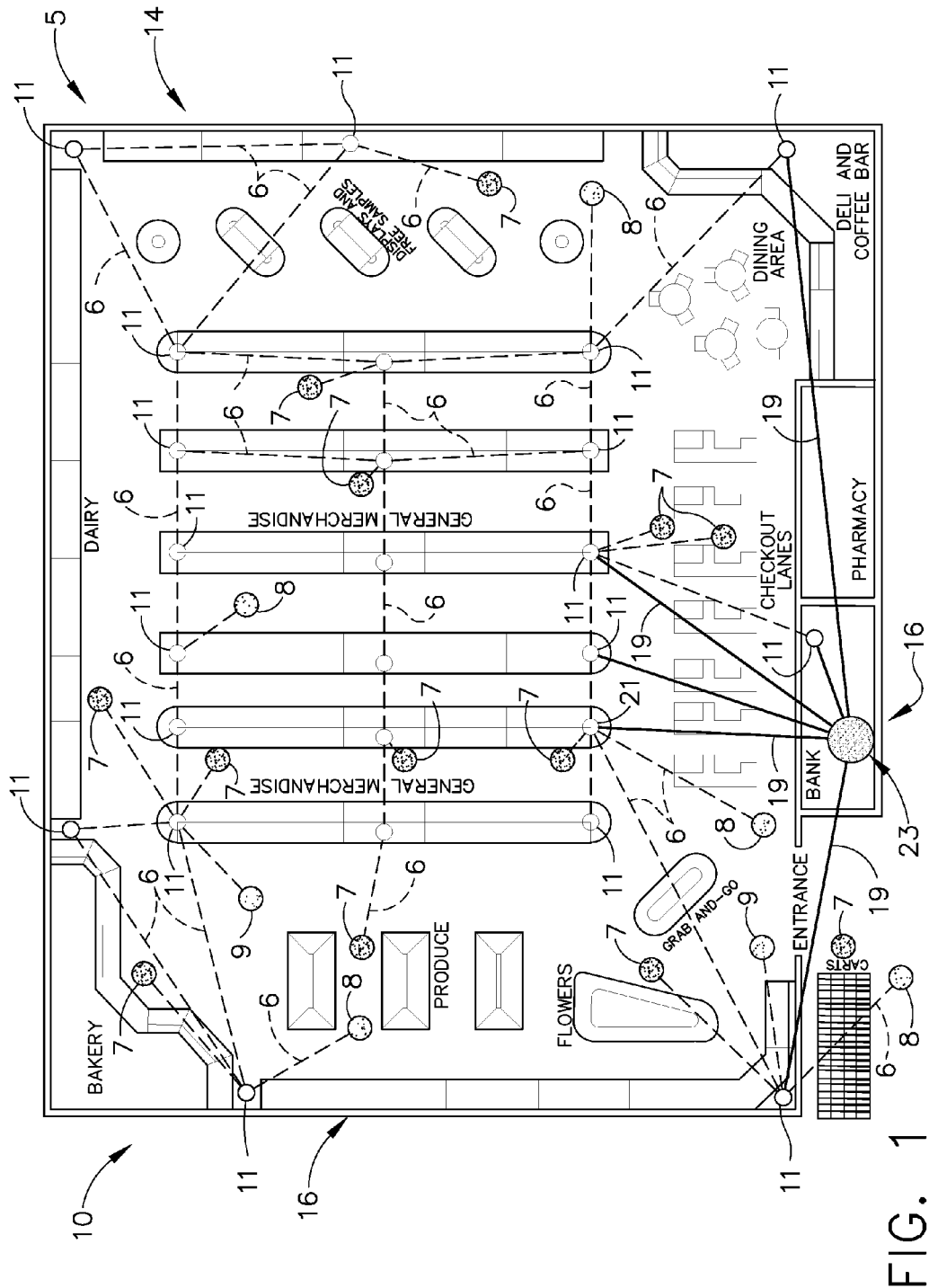
FIG. 1 is a schematic plan view of a store having a preferred store-based multi-network for communication.

In reference to the drawings, similar reference characters denote similar elements throughout all the drawings. The following is a list of the reference characters and associated element:

5 Store
  6 Multi-network communication line
  7 Shopper
  8 Associate
  9 Manager
  10 Communications multi-network
  11 Multi-network router
  14 Mesh communication network
  16 Star communication network
  19 System communication line
  20 Data communication radio
  21 Multi-network organizer
  23 Logic engine
  25 Switch
  27 Gateway server
  29 Store server
  31 Location tracking server
  40 Wireless end device
  42 Interface keys
  44 Cart key
  50 Intelligent shopping cart
  52 Handle
  54 Basket
  55 Interior surface of shopping cart
  56 Under carriage
  58 Weighing device
  60 Hook

DETAILED DESCRIPTION

The term "first moment of truth" is the time of decision that a shopper takes to first consider a product for purchase through to choosing or not choosing the product considered. Additionally, key components of the first moment of truth include 1) the product considered for selection, 2) if selected for purchase, the product selected, 3) the amount of time that a shopper expends to consider a particular product for selection, 4) a shopper's presumed location in a store in relation to a product location at consideration of the product for selection (e.g., in produce, at a display, at an end-cap, etc.) and one, two, three, or four of any one of the four key elements noted hereinabove. Typically, the first moment of truth ranges in time from between about two to about seven seconds. Persons of skill in the art will readily recognize that the first moment of truth may extend beyond the typical threshold and that such extension remains a part of the definition herein for the first moment of truth.

The terms "intended purchase" and "intention of purchase" as used herein mean a shopper's removal of product from a store shelf, kiosk, or display in consideration of potential purchase as well products a shopper has include on her shopping list.

The term "tracked communication" as used herein means the communications multi-network's ability to track wireless end devices when such devices are placed in close proximity to a shopper.

The term "gateway server" as used herein means a server that is receiving data from the communications multi-network of the store through a switch that is being routed by the gateway server to other store servers, such as an associate task managing server, a computer assisted ordering system computer, a point of sale server, location tracking server, an ISP server, or other store computer.

The term "computational functions" as used herein means any and all microprocessor or microcontroller based computational tasks or routines commonly known in the art to occur in a computer or computer-like device that comprises software, memory, and a processor.

The term "computational work" as used herein means those types of common computations associated with known computer and/or server types of devices having complex microcontrollers and/or central processing units (CPUs). Such devices performing computational work typically have the capacity to carry extensive software and execute any various types of routines and sub-routines therein.

The terms "influence" or "influencing" product selection mean the system's ability to make a shopper aware of the following: (1) potential health risks; (2) less expensive alternative product(s); (3) better rated alternative product(s); (4) complementary products to be added to soon-to-be or chosen product(s); and/or (5) product information. It should be noted herein that preferred influencing causes a shopper to act or not act in a manner consistent with a shopper's best interests.

The term "wireless end device" as used herein means an electronic device, and ideally a handheld electronic device, which operates wirelessly through a communications multi-network and is used in close proximity to the shopper as she travels throughout the retail establishment. Each wireless end device operates as a blind node throughout the communication network.

The term "blind node" as used herein means those nodes of the communications multi-network that are would be unknown to the system but for the tracking location subsystem.

In an exemplary embodiment, the wireless end device is coupled with a "product scanning device". As used herein, the term "product scanning device" refers to an electronic device for scanning readable media. A product scanning device includes but is not limited to imagers capable of taking photographs. A readable medium is a unique identifier for an item or class of items within the retail establishment that is capable of being read and understood by an electronic device and in some cases a human. A bar code is an example of a readable medium. Bar codes include but are not limited to a Global Trade Identification Number (GTIN), UPC, UPC-A, UPC-E, EAN13, EAN8, Databar (multiple versions), GS1-128, and any other product identification code known to persons with skill in the art.

In some exemplary embodiments, a wireless end device is temporarily coupled to an intelligent shopping cart, with which the wireless end device, held in close proximity to the shopper. In this embodiment, both the wireless end device and the intelligent shopping cart are associated with and communicatively coupled with the communications multi-network. In alternative exemplary embodiments, the wireless end device is permanently coupled to an intelligent shopping cart.

The intelligent shopping cart is a shopping cart that is configured to receive and weigh items within it. The intelligent shopping cart is in tracked communication with the mesh communication network of the communications multi-network.

Provided herein are systems and methods for implementing a variety of ways to influence a shopper's product selection when said shopper shops throughout a retail environment with a wireless end device. In an exemplary embodiment, a retail establishment captures actual, real time shopper behavior data, the total sum of the shopper location data, product selection data and product selection timing data, to be used to create one or more influential messages. These various types data will be defined in turn.

The term "shopper location data" as used herein means the estimated location of the shopper as tracked through a location tracking device associated with a wireless end device in relation to known product locations. Shopper location data is collected as a product of the tracking location subsystem, in which the logic engine tracks the presumed locations of a shopper as she travels with the wireless end device throughout the retail establishment. Because the retail establishment through the location tracking subsystem in fact tracks the location of the location tracking device associated with the wireless end device which is held in close proximity to shoppers, but in fact is not tracking the humans, the shoppers' locations are presumed. On occasion, shoppers walk away from their assigned wireless end device which is coupled with the location tracking device. On these occasions, the shopper location data is inaccurate. To be clear, shopper location data is accurate within a predetermined tolerated range of error.

The term "product selection data" as used herein means the information collected when a product scanning device scans the readable media of products selected for purchase by the shopper. Said product selection data includes but is not limited to each product's identity (by name and/or internal code) and price. In some instances, product selection data includes the identity of the product's manufacturer or supplier to the store. In certain instances, the product selection data includes the weight or some similar unit of measurement (volume) of the product selected by the shopper for purchase. In exemplary embodiments, product selection data also includes a date and time stamp for each product selection datum collected by the product scanning device.

The term "product selection timing data" as used herein means the amount of time that the shopper spends during each time period of product selection, wherein said amount of time is tracked by the logic engine. The logic engine creates product selection timing data by beginning to record the amount of time that passes from the moment the shopper begins to slow her rate of travel throughout the store at the same time that her location matches up with a product location data through the moment that the shopper scans the readable medium of one or more products. Product selection timing data is determined and tracked by either a timing device physically located within the wireless end device, timing software programmed on the wireless end device, or a hardware or software in association with the logic engine. In exemplary embodiments, said product selection timing data is deleted when a false first moment of truth is detected. More on the false first moment of truth detection will be addressed in greater detail below. The product selection timing data is known to the system, since her approximate positions are known as the shopper travels throughout the store, and this location tracking data can be assessed on a moment by moment basis in actual real time.

In an exemplary embodiment, the retail establishment, specifically through the logic engine, is aware of the location of each product or each group of products, known herein as product locations, because the store employees have recorded the locations of each group of products in a product database as they stocked the items in the store. The locations of the product groups are given coordinates on a product location map, just as nearly all other physical elements of the store are assigned coordinates on a two-dimensional X and Y grid positioned over, or juxtaposed on top of, the store map. In an exemplary embodiment, the retail establishment, through a logic engine, is aware of the precise location of over about eighty percent of the products on display in said retail establishment. In alternative embodiments, the retail establishment is aware of the majority of product locations, the precise locations of the products on display in said retail establishment. Thus, with the knowledge of the presumed location of each wireless end device within the retail establishment through shopper location data collected in real-time, and with the knowledge of the product locations, the retail establishment can compare the shopper location data with the product locations to determine when a shopper is in close proximity to certain products on display within the retail establishment.

In practice, the system herein detects shopper's engagement in product selection when it detects that her rate of speed is substantially slower than the shopper's average rate of speed and when the shopper's presumed location in the store is in front of a product display in the store. Part of this detection includes the comparison of the two relative speeds between the time of product consideration for possible purchase and the typical shopper's typical travel through a store. In exemplary embodiments, the store has a detailed profile on the particular shopper, wherein the detailed profile includes the shopper's average rate of speed in the store, so that the logic engine's detection of a first moment of truth is highly accurate.

The term "actual, real time shopper behavior data" as used herein refers to as used herein means the total sum of a shopper's identification data, location tracking data, product scanning data and product selection timing data. Ideally, actual, real-time shopper behavior data also includes a shopper's personal and demographic profile.

The logic engine of the retail establishment, using said actual, real time shopper behavior data, creates and transmits an influential message to the wireless end device, which is in close proximity to said shopper as she shops within or about the retail establishment. In alternative embodiments, the retail establishment only uses product selection timing data and the shopper's location tracking data to create the influential messages that are then transmitted to the wireless end device in close proximity to said shopper as she shops within or about the retail establishment.

The logic engine creates "shopping trip timing data", which is referred to herein as the entire amount of time each shopper spends on her entire shopping trip. If the shopper has not completed her shopping trip, then the shopping trip timing data is incomplete, but reflects the amount of time said shopper has spent thus far on her current shopping trip. To create said shopping trip timing data, said logic engine records the entire amount of time the shopper spends in the store from the first moment the shopper's wireless end device associates with the store's communications multi-network to the time the shopper checks out from the store.

To be clear, the term "logic engine" as used herein means one or more electronic devices comprising a switch and a server. The logic engine includes hardware such as one or more server-grade computers, but also includes the ability to perform certain computational functions through software. Mechanisms known in the art other than software can be used provided that the mechanism allows the logic engine to go through logic functions to provide location calculations, evaluations, conduct timing, etc. The logic engine is additionally capable of performing the functions of the switch, gateway server, and store computers, such as an associate task managing server, a computer assisted ordering system computer, an in store processor (ISP server), the location tracking server, commerce server, or other store computer. Further, the logic engine serves as the retail establishment's main database, including but not limited to the product database and the shopper profile database. Functionally, the logic engine routes, organizes, manages, and stores data received from other members of the communications multi-network. In exemplary embodiments, the logic engine has the means of performing ray tracing calculations and blind node location calculations. Though the embodiments described herein reference "a logic engine," it is contemplated that multiple logic engines can be used to perform the same function within the communications multi-network.

In the systems and methods disclosed herein, most, if not all, necessary wireless electronic communication between shoppers and the retail establishment occurs through a communications multi-network when said wireless electronic communication occurs within the retail establishment itself, upon the retail establishment's premises, which can include the boundary controlled by the retail establishment (e.g., the store parking lot). In embodiments where a communications multi-network is enabled, two or more communication networks work together, though not necessarily dependently, to track the location of the wireless end devices used by shoppers, to track the location of products, to track first moments of truth and to be aware of the identities of products and shoppers within or about the retail establishment. The communications multi-network comprises: (1) at least two mesh communication networks; (2) at least two star communication networks; (3) at least one star communication network and at least one mesh communication network through which the location tracking device operates; or (4) two or more other types of communication networks known to persons with skill in the art. In selected embodiments, the communications multi-network is a single network architecturally, but functionally operates as two or more differently functioning networks. For example, there may be a single network that functions as a star communication network and a mesh communication network at the same time.

An exemplary mesh communication network is a ZIGBEE communication network which operates within the Institute of Electrical and Electronics Engineers (IEEE) 802.15.4 communication protocol, but person with skill in the art will appreciate alternative communication protocols that can be employed instead of the 802.15.4. The benefits of using ZIGBEE communication network as a mesh communication network herein are several. ZIGBEE communication network is known for its low power consumption, low cost of implementation, high density of component use (e.g., the use of dozens, if not hundreds, of multi-network routers and/or wireless end devices for one mesh communication network), and its simple communications protocol. ZIGBEE protocols are intended for use in wireless communication networks requiring low data rates and low power consumption. ZIGBEE communication network also provides an inexpensive communications multi-network that can be used for industrial control, embedded sensing, medical data collection, smoke and intruder warning, building automation, home automation and many others. The resulting network uses very small amounts of power which can then allow individual devices to run for up to one year or more using originally installed batteries.

The ZIGBEE protocol operates in the industrial, scientific and medical (ISM) radio bands; i.e., 868 MHz in Europe, 915 MHz in the USA and 2.4 GHz in most other jurisdictions worldwide. ZIGBEE technology is intended to be simple, inexpensive and readily maintainable. In one execution, the most capable multi-network router within ZIGBEE communication network requires only about 10% of the software of a typical BLUETOOTH or other wireless internet node though a BLUETOOTH execution is also contemplated herein. In another execution, multi-network router only contains about 2% of the software of a typical BLUETOOTH or other wireless internet node for use within ZIGBEE communication network 15 thus greatly reducing technical complexity and potential maintenance costs.

The star communication network of communications multi-network also operates within the IEEE 802.15.4 communication protocol, although it could be operated on a different protocol, depending on the specific application contemplated. Moreover, each mesh communication network includes a mesh network organizer. In certain embodiments of the communications multi-network, the mesh network organizer is housed with a data communication radio in a device called the multi-network organizer, and one or more information routers.

The mesh network organizer, a radio for the mesh communication network, assigns addresses to all members of the mesh communication network. The mesh network organizer is the single point of entry to the mesh communication network from the gateway server. The mesh network organizer routes information, also known as packets of data, to and from information routers and the central store computer. In one embodiment, the mesh network organizer routes location tracking data to and from information routers and the logic engine. In one embodiment, the mesh network organizer communicates with the logic engine through an Ethernet cable, while communicating wirelessly through the mesh communication network to the other devices attached to the mesh communication network. Other devices attached to the mesh communication network can include information routers, wireless end devices, intelligent shopping carts, HVAC monitors and controls, security systems, traffic counters, and other electronic devices depending on the specific application contemplated. Both communication between information routers, and communication between information routers and the mesh network organizer, can be wired or wireless. Functionally, the mesh network organizer routes location tracking data of wireless end devices of both associates and shoppers to managers. Because the mesh network organizer transmits data through a radio, it broadcasts or radiates out radio waves to other members of the mesh communication network.

The information routers, also known as stationary reference nodes, are end nodes and fixed members of the mesh communication network. Each stationary reference node operates through the mesh communication network to receive information from and send information to intelligent shopping carts, wireless end devices, the mesh network organizer, other information routers, and other network devices communicatively coupled to the mesh communication network. Each information router transmits Received Signal Strength Indication (RSSI), X and Y coordinates belonging to the position of the information router and the address of the closest data communication radio to any requesting wireless end device. Each information router comprises one or more radios. Examples include, but are not limited to, the following: Texas Instruments Models 2430 and 2431.

In those embodiments utilizing one or more star communication networks, the star communication network comprises data communication radios which operate as hub nodes or central nodes of each star communication network. The data communication radio routes data information, also known as packets of data, to and from wireless end devices and the logic engine. In one embodiment, the data communication radio transmits data through a wire, for example, an Ethernet cable, when communicating with the logic engine, while simultaneously communicating wirelessly through the star communication network to the wireless end devices, intelligent shopping carts, and/or other blind nodes and electrical devices attached to the star communication network. Functionally, the data communication radio routes data, such as influential messages from the logic engine to the wireless end devices. The data communication radio broadcasts or radiates out radio waves to other members of the star communication network instead of communicating strictly in straight lines.

In exemplary embodiments of the communications multi-network that include a mesh communication network and a star communication network, the information router of the mesh communication network and the data communication radio of the star communication network are housed together in a device herein referred to as a multi-network router. Each said multi-network router houses at least three microcontroller unit (MCU) radios: one that functions as an information router for the mesh communication network, and at least two that function as data communication radios for the star communication network. Two of the three radios are low powered radios, including but not limited to Texas Instruments Models 2430 or 2431, while the third radio is a controller with greater power, such as the Texas Instruments models above the 243x series. Functionally, multi-network routers communicate wirelessly or over wires to other multi-network routers. Ideally, multi-network routers communicate wirelessly to the wireless end devices, intelligent shopping carts, and other electrical devices used by shoppers, associates, and managers within the store. The multi-network routers communicate with the central computer, or logic engine, through the multi-network organizer.

In exemplary embodiments, the location tracking of shoppers is conducted over the mesh communication network of the communications multi-network, though it is possible to operate such a tracking function over the star communication network. The wireless end device communicates with the stationary radios of a communications multi-network (the information routers of the mesh communication network, the data communication radios of the star communication network, or the multi-network router of the communications multi-network). The stationary radios transmit their X and Y set of positional coordinates to the wireless end device positioned in close proximity to the shopper as she moves throughout the retail establishment. Furthermore, the signal strength of each stationary radio is measured either by the wireless end device, the logic engine, or another store server, such as the location tracking server. The X and Y set of positional coordinates of the wireless end device is calculated based on the signal strength measured and the X and Y set of positional coordinates of the nearest stationary routers. The subsystem of tracking the location of shoppers of certain embodiments of the invention are more fully described in U.S. Nonprovisional patent application Ser. No. 12/353,817 filed on Jan. 14, 2009, and U.S. Nonprovisional patent application Ser. No. 12/353,760 filed on Jan. 14, 2009, which are hereby incorporated fully by reference.

In an exemplary embodiment, the logic engine stores location data on products and shoppers within a store. In an example subsystem of tracking the location of shoppers, the logic engine creates an historical progression, which is a map of the path a shopper takes while shopping in a store. The logic engine matches the historical progression taken for a particular shopping trip with the list of items purchased by the shopper on said particular shopping trip.

To be clear, any computation or storage completed by the logic engine can be performed, in selected embodiments, by a specific server called the location tracking server. Thus, whenever a logic engine is used in this context herein, the use of a location tracking server is contemplated. The wireless end device continuously transmits its unique identifier address to the logic engine, allowing the logic engine to create a shopper location data. As used above, the term "continuously" herein means a predetermined interval of time, for example, every five seconds or every ten seconds, as determined by the software engineer. Moreover, when said wireless end device is stationary for a predetermined period of time programmed in the software of the wireless end device, the wireless end device automatically powers down or turns off and continuous transmission of the wireless end device's unique identifier address ceases. Any period of time can be set to be the predetermined period of time before the wireless end device powers down, such as ten minutes or thirty minutes. The benefit of the ability to automatically power down is reduced energy consumption. Furthermore, in exemplary embodiments, when the wireless end device returns to a state of motion from its stationary position, the wireless end device automatically powers on to restore the continuous transmission and tracking features.

In exemplary embodiments of the systems and methods herein, the retail establishment, specifically the logic engine, detects the first moment of truth of each shopper before an influential message is delivered to said wireless end device of said shopper. In some embodiments, the retail establishment assumes that the shopper is experiencing a first moment of truth when the shopper's location tracking device pauses for a predetermined period of time, e.g. three seconds, in front of product locations. In other embodiments, the retail establishment assumes that the shopper is experiencing a first moment of truth when said shopper's location tracking device slows to a predetermined pace within said store when within a predetermined ratio from the products on display. In still other embodiments, the retail establishment assumes that the shopper is experiencing a first moment of truth based on a comparison of said shopper's speed and location within said retail establishment (or shopper location data) with said shopper's shopping list and proximity of said products on display in said retail establishment that are on said shopper's shopping list.

In some embodiments, a corroboration method is used to determine if an assumed first moment of truth is in fact a false moment of truth. To be clear, the logic engine can detect a false first moment of truth when said shopper seems to be considering a product for purchase, but in fact is not considering a product for selection. For instance, with the knowledge of shopper's location tracking data signifying to said logic engine that said shopper is in the meat department and is slowing in speed, the software on the logic engine triggers a possible first moment of truth, which signals that an influential messages should be delivered. However, with additional information, such as knowledge of a "clean up" in the shopper's location (in this example, the meat department), the logic engine determines that the shopper is likely experiencing a false first moment of truth. When the logic engine determines that the assumed first moment of truth is false, the logic engine does not send said influential message to said shopper.

Corroboration of the first moment of truth can be accomplished in a number of ways. In some embodiments, software on the logic engine evaluates the shopper location data in relationship to said product selection data to reduce, or even eliminate inconsistent information and prevent the transmission of influential messages at a false first moment of truth. In other embodiments, said logic engine evaluates shopper location data in relationship to said shopping trip timing data to identify a false first moment of truth. In another embodiment, said logic engine evaluates shopper location data in relationship to said shopping trip timing data and said shopper's velocity of travel to determine if a false first moment of truth is present. After a first moment of truth is detected, and in certain embodiments is corroborated, the software on the logic engine is programmed to automatically transmit one or more influential messages, which are often product and location specific, to influence the shopper's behavior.

Before the influential message is transmitted, it is created by the logic engine. When the shopper's unique, personal identity is known, the influential message can be tailored to the interests and past shopping behavior of the particular shopper. Since each time that a wireless end device is in close proximity of the store, the wireless end device associates with the store's communications multi-network by sending a signal to the logic engine, the retail establishment is aware of the shopper's unique, personal identity anytime the shopper shops with her wireless end device.

The identification of the shopper occurs in various ways, usually at the beginning of each said shopping trip when the shopper begins using the wireless end device. In some embodiments, if said wireless end device is temporarily assigned to said shopper at the beginning of said shopping trip, the shopper's unique, personal identity is made known to the retail establishment at the moment the shopper scans the readable medium of an exemplary shopper's card on a product scanning device associated with her wireless end device.

In other embodiments, if said shopper enters said store with a wireless end device previously assigned to her on a permanent or semi-permanent basis, or even if said wireless end device was purchased by her, the shopper's unique, personal identity is made known to the retail establishment at the moment the wireless end device associates with said communications multi-network of said retail establishment. Where the wireless end device has been previously assigned to said shopper on a permanent or semi-permanent basis, the shopper previously scanned the readable medium of her shopper's card on the product scanning device associated with her wireless end device, thereby allowing said shopper's unique, personal identity to be identified upon initial association with the retail establishment.

An actual physical shopper's card is not necessary to identify said shopper's unique, personal identity. If shopper's cards are not utilized by said store, then said shopper's unique, personal identity is made known to the retail environment the moment said shopper voluntarily provides her unique, personal identity information to said retail establishment and her unique, personal identity information is entered into said logic engine. The logic engine then opens an electronic file for said shopper that is associated with the unique identifying address of the wireless end device to be used by said shopper. The entry of unique, personal identity information into the logic engine can occur directly or indirectly. If it occurs indirectly, then said associate or said manager enters said unique, personal identity information into a computer that is communicatively coupled to said communications multi-network that then transmits the unique, personal identity information through said communications multi-network to said logic engine.

In an exemplary embodiment, an intelligent shopping cart associates with the communications multi-network by transmitting a signal to the logic engine when it is in motion. Then, the intelligent shopping cart automatically shuts down its communication with members of the communications multi-network when it is left in the same location for a certain period of time, for example ten or fifteen minutes. Thus, the intelligent shopping cart is not associated with, and is not in tracked communication with, said logic engine when said intelligent shopping cart has not been in motion for a predetermined length of time. As with the wireless end device, the automatic shut down conserves energy when the intelligent shopping cart is not in use. Software loaded onto either the intelligent shopping cart or the logic engine permits a tolerance range to be set, allowing the store to customize the amount of time the intelligent shopping cart can be stationary before the power is reduced. In an alternative embodiment, the intelligent shopping cart is in continuous or near continuous communication with the communications multi-network, so long as it remains in close proximity to the communications multi-network.

With knowledge of the shopper's general preferences based on a category of shoppers of which the individual shopper is a member, and with the knowledge of the shopper's precise real-time location, the logic engine transmits one or more influential messages tailored to (1) the presumed or general preferences of the shopper, and (2) the precise real-time location of the shopper in the store. For example, Mariah, a 29-year-old professional African American woman who is a brand loyal shopper, begins shopping in the store with a wireless end device, which was assigned to her two years ago by the store. Mariah scanned the readable medium of her preferred shopper card two years ago when she received the wireless end device. When Mariah begins shopping in the store with her wireless end device, the wireless end device associates with the communications multi-network of the store, making the store aware of her presence in the store. The retail establishment places Mariah in a category of shoppers that share a similar shopping behavior trait, such as brand loyalty. In some embodiments, the retail establishment, through the logic engines, transmits one or more influential messages, which are tailored to the category of shoppers, to all members of the category of shoppers upon their respective entries into the retail establishment. In exemplary embodiments, the logic engine transmits influential messages tailored to the category of shoppers to all members of the category of shoppers when a first moment of truth is detected.

In other embodiments, the retail establishment categorizes shoppers based on demographics rather than past shopping behavior. In still other exemplary embodiments, said retail establishments categorize shoppers based on both previously exhibited shopper behavior and demographics. In such an embodiment, the retail establishment will tailor an influential message for all professional, African American women in the age bracket 25 to 35, who are brand loyal. In this case, Mariah will receive the same influential messages as all other known members of the category of shoppers that includes professional, African American women in the age bracket 25 to 35, who are brand loyal.

Influential messages include suggestions that the shopper purchase a different size or quantity of a certain brand of detergent on which the retail establishment makes a higher profit, for example. Other potential messages to influence shoppers include suggestions to purchase additional products that other members of the category of like shoppers frequently purchase. For instance, while Mariah is in the aisle displaying laundry detergents, the retail establishment, aware of her unique, personal identity information and her location within the store, transmits to her wireless end device influential messages suggesting that she purchase a fabric softener or a wrinkle releasing agent.

In other embodiments, each shopper receives influential messages specifically tailored to her unique, personal identity information at the first moment of truth. This influential message can be in addition to or in place of influential messages tailored to the category of shoppers of which the shopper is a member. For instance, the store knows that Steve, a 59-year-old Caucasian, spends $100 every week at the store and when he purchases laundry detergent, he only purchases laundry detergents being marketed under the trademark TIDE® (3389568; The Procter and Gamble Company; laundry detergent). With this knowledge, the store may offer Steve a special offer, like five dollars off the purchase price, to purchase a laundry detergent marketed under the trademark CHEER® (2825038, The Procter and Gamble Company; laundry detergent) in order to entice him to switch brands. Steve benefits because he receives a discount on his detergent. The retail establishment also benefits in a number of ways including satisfying certain sales goals to keep or attract certain vendors, and potentially higher profit margins. For example, the retail establishment may have a higher profit on CHEER® than it does on TIDE®, thus when Steve buys CHEER® and potentially switches brands, the retail establishment experiences higher profit margins.

The retail establishment learns the shopper's personal preferences in a variety of ways. For example, the retail establishment can have the shopper fill out surveys about store conditions, preferred products, and suggestions on how to improve the shopping experience. Surveys can be filled out either on paper or electronically in the retail establishment or at home. The retail establishment can also learn the shopper's personal preferences from reviewing each shopper's shopping history with the retail establishment. Retail establishments additionally have access to shopper generated shopping lists, since the system provides for shopping lists to be created and shared with retail establishments in a number of ways. Shoppers can scan products' readable media as the shoppers use up products in their homes using product scanning devices associated with wireless end devices that they have taken home. Alternatively, said shopping list can be created electronically by said shopper on a retail establishment owned or monitored website that then communicates said shopping list to the logic engine of the retail establishment in which said shopper shops.

In exemplary embodiments, the logic engine is aware of a variety of information that includes, but is not limited to the following: (1) demographic information collected from shoppers when they obtain preferred shopping cards; (2) the purchasing history associated with an exemplary shopping cards; (3) historical progression; (4) information collected from shopper surveys; and (5) shopping lists and/or inventory lists created by shoppers at non-store locations (such as their homes) on their personal computers or wireless end device. A significant amount of shopper information known by the retail establishment is created by the shopper at non-store locations. Much of this shopper information is contributed by the shopper while she is at home through the wireless end device assigned to the shopper on a permanent or semi-permanent basis, or through the Internet. Retail establishments with access to this plethora of shopper information created at non-store locations use said shopper information to influence shoppers by tailoring influential messages or by selecting the appropriate pre-made influential messages to use on shoppers during their next shopping trip.

It is advantageous to both retail establishments and shoppers for retail establishments to have access to shoppers' shopping lists, because retail establishments can suggest additional items to be purchased that either (1) complement the shopper's shopping list to provide a complete menu, or (2) complete a recipe. For instance, in the event the shopper has on her shopping list hotdogs and buns, the retail establishment transmits an influential message, suggesting that the shopper consider purchasing ketchup, mustard, and relish, to the wireless end devices used by the shopper when the shopper is in the condiments aisle. Alternatively, the retail establishment can suggest the shopper use a recipe that can be created with the purchase of just a few additional ingredients. For example, when the retail establishment is aware that the shopper has chips and salsa on his shopping list, the retail establishment can transmit an influential message suggesting that the shopper additionally purchase cheese to make nachos.

With knowledge of the shopper's inventory list in combination with the knowledge that the shopper is in a certain department of the retail establishment, the retail establishment can send the shopper an influential message just before or just as the shopper starts to leave that department. For example, the retail establishment can send a reminder to the shopper to not forget certain products for sale in that particular department that are not on said shopper's inventory list.

Just as shoppers vary from one to another, so too does the content of the influential messages. The content of the influential messages includes, but is not limited to the following: the form of recipe suggestions; suggested entries for the shopper's shopping list; e-coupons; targeted pricing of an item, which is similar to a coupon yet may better reflect the supply and demand relationship between the retail environment and its customer; alerts when a shopper has passed a product on her shopping list; discounts; product reviews; competitive product offers; enhanced saving opportunities (e.g., a potential system alert could be the following: "We see that you have selected five two liters of soft drinks, purchase five more and receive $2.00 off"); co-branding opportunities (e.g., "We see that you have selected COCA COLA®, a mark registered to The Coca-Cola Company for soft drinks, why not try some LAY'S®, a mark registered to Recot, Inc. for potato crisps, along with your COCA COLA®?"); responses to historical progression of product selection; general product warnings (e.g., "This product contains iron" or "This is a dairy product."); product warnings tailored to shopper profile (e.g., a shopper's profile includes allergen data that someone in the shopper's family is allergic to peanuts, thus the influential message may be "The product you just selected was produced in a factory that handles peanuts."); combination product warnings (e.g., "We see that you purchased a prescription medication last week that may conflict with the prescription medication that you have ordered for pick-up today, please consult your physician before taking two prescription medications."); health awareness alerts that provide specific product information such as sodium content or fat content; product and store surveys; internal maps on how to find products within the retail establishment; and other influential messages known in the art. Furthermore, influential messages can be varied in the type of media employed, such as text messages, electronic photographs, illustrations, videos, audio, hyperlinks, and interactive messages.

In addition to these methods of tailoring the influential messages to the shopper's product consideration, the logic engine tailors the influential messages using information that includes but is not limited to the following: (1) the time and date the shopper is in the retail establishment; (2) the shopper's general preferences already known to the retail establishment; (3) the shopper's personal preferences already known to the retail establishment; (4) the shopper's previous purchases; (5) the shopper's real time intended purchases known to the store through organization by the logic engine of product scanning data and shopper location data; (6) the shopper's shopping list; (7) the shopper's home inventory list; (8) the actual time period the shopper spends considering purchasing a particular product or class of products; (9) the amount of money that the shopper chooses to spend on any one or several items according to the shopper's inputted budget for one or more items; (10) the promotional prices (advertised or otherwise) currently in the retail establishment; (11) the shopper's previously staged electronic coupons or previously scanned paper coupons; (12) the shopper's requests for "health alerts" (ex: allergens) in her profile; and (13) the shopper's request for alerts to marked down individual packages due to close expiration dates for categories that they intend to purchase. The above list is by no means exhaustive and additions to the list can be readily made.

Ideally, the system provides influential messages that then influence the shopper's product selection and the shopper follows through with the purchase of products. Such influencing includes, but is not limited to, adding more products to those chosen or considered, exchanging a product chosen or considered for one suggested by the system, and/or removing a chosen product due to some known allergic or chemical reaction by the shopper or members of a shopper's household. Each of the reactions can be measured by the logic engines when the actual, real-time shopper behavior data is known. However, even if the influential messages do not influence the shopper's product selection, the retail establishment is aware of the shopper's decision not to follow the suggestion of the retail establishment and can retain that information specific to the shopper for later analysis and review of the reasons as why the product was not selected. The retail establishment can analyze which types of influential messages are most effective and even what displays in the retail establishment influenced or did not influence the shopper to choose or not choose products. This information provides retail establishments with the opportunity to tailor future influential messages to be superior to all other types of the influential messages.

In contrast, there are embodiments wherein the influential messages are not tailored to the individual by the logic engine, but instead are selected from a variety of already prepared influential messages. In this event, the system selects the most influential of the already prepared influential messages, based upon the actual, real-time shopper behavior data. Other embodiments employ a mixture of both tailored and pre-made influential messages.

In an exemplary embodiment, shoppers "opt in" to the types of influential messages they want to receive. For instance, some shoppers will want health awareness alerts, while others would rather receive more information on product pricing, saving opportunities, promotions, etc. Examples of the types of influential messages are described in turn below.

As briefly discussed above, in some embodiments, the retail establishment influences shopper behavior by suggesting the shopper make certain recipes. When the retail establishment suggests the purchase of certain items to complete a recipe, the retail establishment is aware of certain shopper information such as the shopper's shopping list, the shopper's home inventory list, or the shopper's already scanned selected items for purchase during the shopping trip. The term "recipe" as used herein includes projects, which requires items to be purchased and assembled in some fashion to achieve the desired result, much like a recipe. For instance, when a hardware store is aware that the shopper is purchasing house paint and brushes, in an exemplary embodiment, the hardware store suggests in an influential message that the shopper purchase sea sponges and glaze, so that the shopper can complete a faux painting project.

In another embodiment, the influential message provides shoppers the best routes to travel while shopping in the retail establishment, using the shopper's known shopping list. The retail establishment will provide either maps or directions to find all of the items on the shopper's shopping list. Exemplary embodiments provide shoppers with shopping routes tailored to real-time events within the retail establishment.

These embodiments allow stores to utilize the location, timing, and personal information of each shopper to tailor influential messages to the product the shopper is considering purchasing. Furthermore, the influential messages are transmitted through the communications multi-network to the wireless end device at the time the shopper is actually considering selecting the product for purchase. This could be at, during, or just after a first moment of truth.

FIG. 1 provides a schematic plan view of retail establishment 5. In particular, a top view of a section of retail establishment 5 in which shopper 7, associate 8, and manager 9 are positioned and associated within communications multi-network 10 for wireless communication between members of the communications multi-network 10 is shown. Communications multi-network 10 is positioned within and about retail establishment 5 and the store's premises (e.g., the store's parking lot and other outer areas—not shown).

The communications multi-network 10 in FIG. 1 comprises a mesh communication network 14 and a star communication network 16. However, the make-up of the communications multi-network varies depending on the specific application contemplated. Preferably, the communications multi-network 10 includes at least one mesh communication network and at least one star communication network. Through the wireless end device, the shopper 7 communicates data, including machine readable messages and location information to the logic engine through the communications multi-network. In exemplary embodiments, human readable messages and machine readable information, such as barcodes, are communicated through the star communication network 16 of the communications multi-network 10 while the operator's X and Y positional coordinates are tracked through the mesh communication network 14 of the communications multi-network 10.

Shopper 7, associate 8, and manager 9 are each connected through multi-network communication lines 6 and multi-network router 11 to both mesh communication network 14 and star communication network 16 of communications multi-network 10. FIG. 1 shows an embodiment in which multi-network routers 11 operate for both the mesh communication network 14 and the star communication network 16. Each multi-network router 11 contains the components for transmission of data through mesh communication network 14 and star communication network 16, allowing it to operate as a radio for mesh communication network 14 or star communication network 16.

In selected embodiments, each multi-network router 11 is placed in a location that is out of reach of persons shopping or working in retail establishment 5. For example, in FIG. 1, each multi-network router 11 is close to or in the ceiling of retail establishment 5. Preferably, though not necessarily, each multi-network router 11 houses at least three radios: a first radio functioning as an information router of mesh communication network 14, and at least two more radios functioning as a data communication radio of the star communication network 16. In exemplary embodiments, in addition to the three radios, each multi-network router 11 comprises a computer component complete with its own IEEE address; the computer component allows the information collected by any of the radios to be transmitted over cable wires, shown herein as system communication lines 19, to the logic engine 23.

In the embodiments utilizing a communications multi-network 10, each multi-network router 11 contains all necessary components to operate for both mesh communication network 14 and star communication network 16. Multi-network router 11 comprises at least three microcontroller units (MCUs). One MCU is used for mesh communication network 14 and at least two are used for star communication network 16. Each MCU is preferably a system-on-a-chip type of MCU and comprises a control unit, one or more registers, an amount of ROM, an amount of RAM and an arithmetic logic unit (ALU).

The Texas Instruments CC2431 MCU is an exemplary MCU for use as one of the radios for the mesh communication network 14 and for one of the at least two radios used on the star communication network 16, because of its ability to readily transmit data through mesh communication network 14 and star communication network 16 at prescribed data transmission rates. Also, the Texas Instruments CC2431 MCU can provide location detection functions within communications multi-network 10 herein. Alternatively, the Texas Instruments CC2430 MCU is an exemplary MCU for use as one of the radios for mesh communication network 14 and for one of two radios used on star communication network 16. The third radio of the at least three radios of multi-network router 11 should be a more powerful radio than those of the Texas Instruments CC243x series.

As shown in FIG. 1, the multi-network organizer 21 operates as both a hub for the star communication network 16 and as a mesh network organizer for the mesh communication network 14. While the radios for the mesh communication network 14 and the star communication network 16 are shown herein as housed in the same device, they could be housed in separate units depending on the specific application contemplated. Every mesh communication network 14 needs a mesh network organizer. In the embodiment shown in FIG. 1, the mesh network organizer is referred to as multi-network organizer 21 because it is housed with a data communication radio. In other embodiments, the mesh network organizer could be in a standalone unit without a data communication radio.

Referring to FIG. 1, system communication lines 19 are shown connecting each multi-network router 11 to the logic engine 23. System communication lines 19 can be either wireless or wired, and are depicted as solid lines to indicate that they are wired in FIGS. 1, 2B, 3A, 3B, and 4. Ethernet cable is an exemplary wired connection device between each multi-network router 11 and logic engine 23. The system communication lines 19 shown in the Figures are merely exemplary, as system communication lines 19 connect from every multi-network router 11 and multi-network organizer 21 to logic engine 23. In exemplary embodiments, the system communication lines 19 connect multi-network routers 11 to one another.

Also shown in FIG. 1 are multi-network communication lines 6 that correspond to zones of transmission between multi-network routers 11 within mesh communication network 14. In practice, multi-network communication lines 6, though represented as straight lines for purposes of illustration, are not necessarily straight lines, but more accurately are circular zones of transmission emanating from each multi-network router 11. Through such zones of each multi-network router 11, data is transmitted and received.

Figure 7:
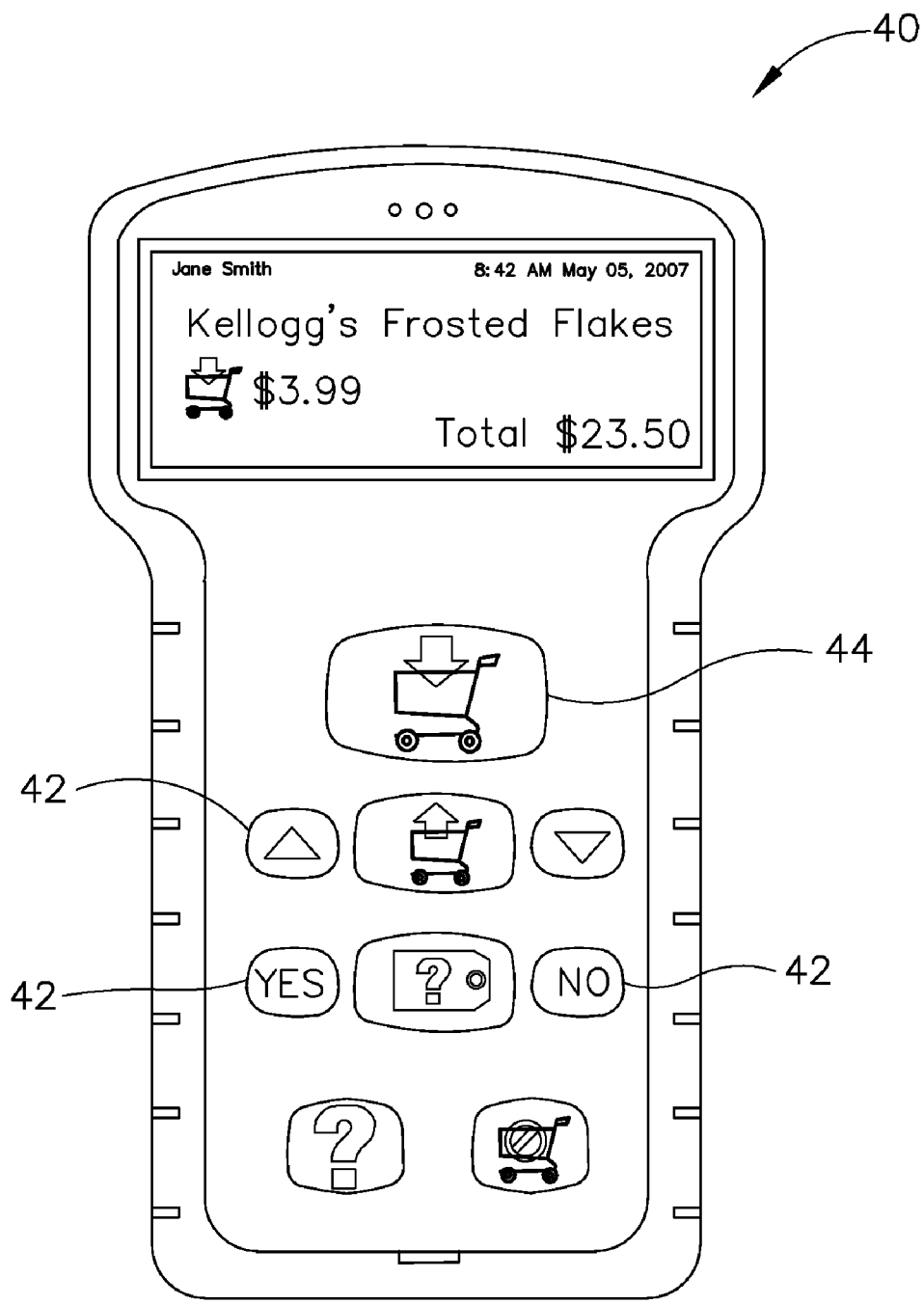
FIG. 7 provides a schematic frontal view of a wireless end device used by a manager, an associate, or a shopper.
Figure 8:
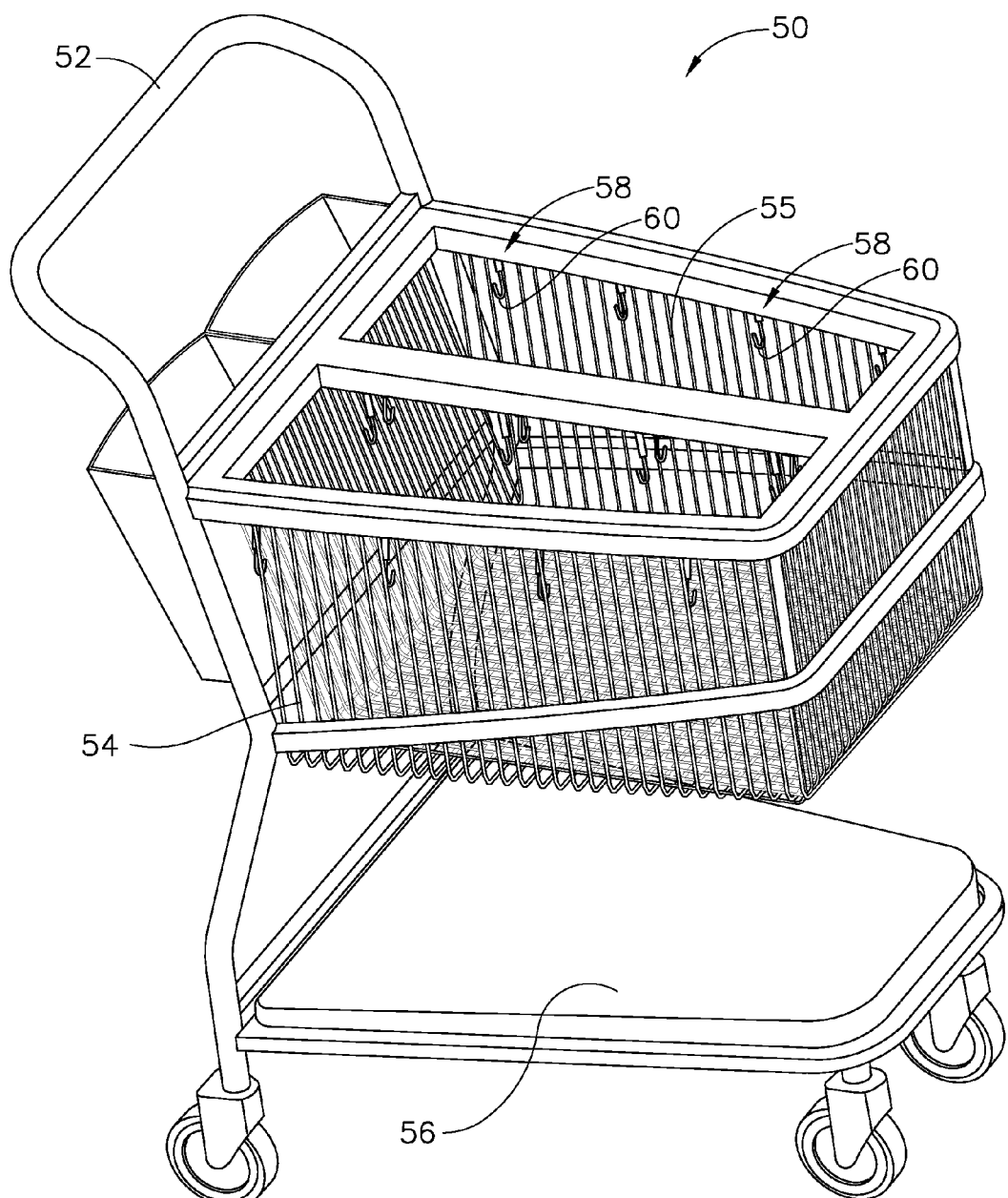
FIG. 8 provides a schematic of an intelligent shopping cart used by a shopper in a store.

In practice, the data transmission rate within mesh communication network 14 is preferably configured to be at least 125 kilobytes per second (KB/s). The data transmission rate within star communication network 16 is preferably configured to be at least 250 KB/s. The interface between shopper 7 and communications multi-network 10 is wireless and is accessed by shopper 7 through either or both of the following: a wireless end device 40 (as shown in FIG. 7), and an intelligent shopping cart 50 (as shown in FIG. 8) over multi-network communication lines 6.

Figure 2A:
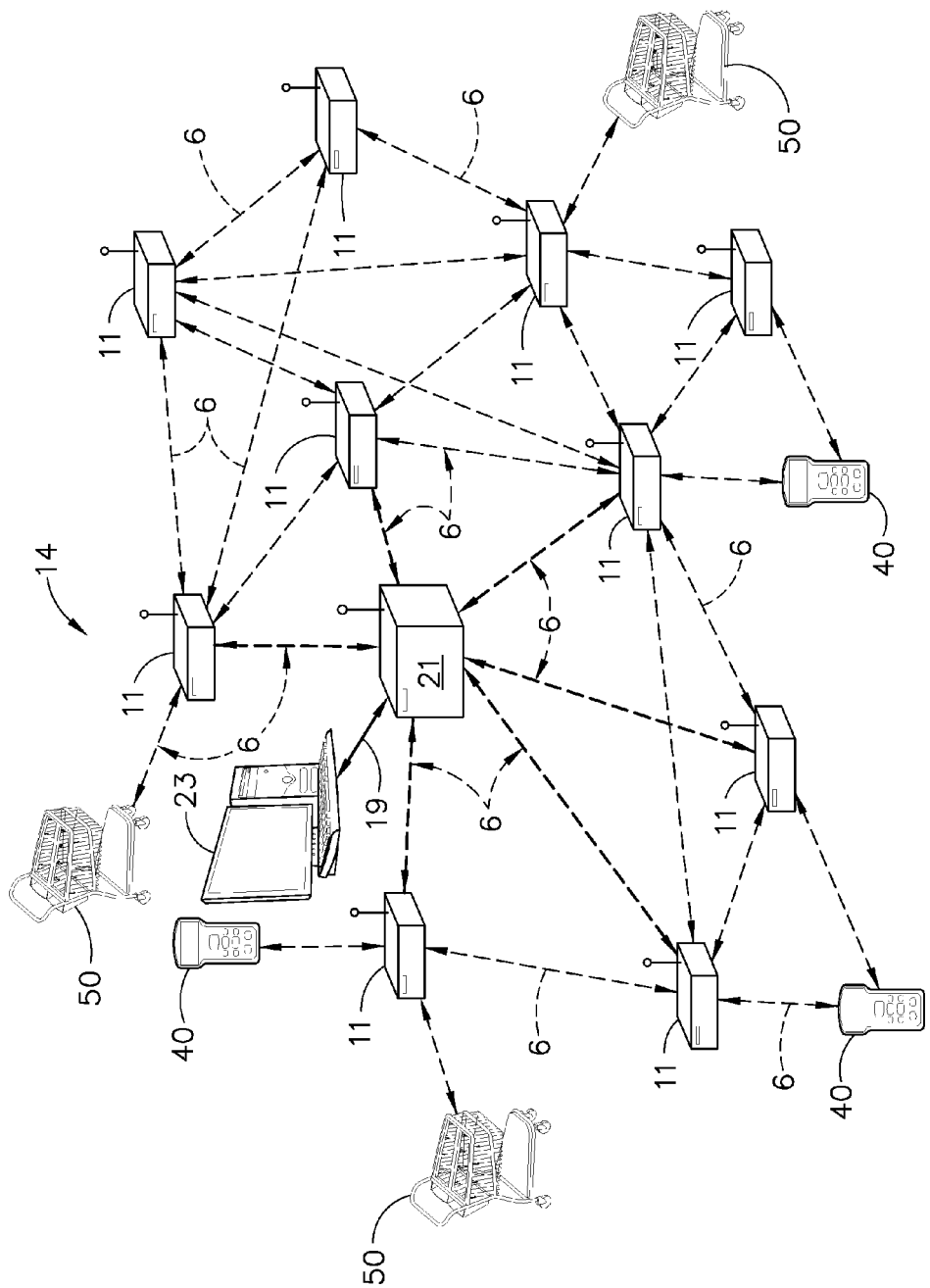
FIG. 2A and FIG. 2B provide a schematic view of an exemplary mesh communication network useful in a store.

Referring now to FIG. 2A, a schematic representation of an exemplary mesh communication network 14 is provided. Multiple multi-network routers 11 are in wireless communication with members of the mesh communication network 14 via multi-network communication lines 6. Members of the mesh communication network 14 can include wireless end devices 40, intelligent shopping carts 50, and a multi-network organizer 21 which operates as the mesh network organizer (shown housed with a data communication radio). Multi-network communication lines 6 depicted as dashed lines in order to show the direction and existence of wireless lines of communication between the information routers that make up mesh communication network 14 and other components (for example, the wireless end devices 40 and multi-network organizer 21). Mesh communication network 14 provides many benefits including low power consumption, low cost of operation, efficient communication within a defined space and low cost for maintenance.

As shown in FIG. 2A, each multi-network router 11 has the ability to communicate with at least some of the other multi-network routers 11 in the mesh communication network 14. In some embodiments, each multi-network router 11 is able to communicate with every other multi-network router 11, the multi-network organizer 21, or wireless end device 40 associated with the mesh communication network 14.

Mesh communication network 14 is a local area network (LAN) that employs one of two connection arrangements. One arrangement is a full mesh topology wherein all of the multi-network routers 11 are wirelessly connected to one another and can receive and transmit information to every other multi-network router 11 within the mesh. Another exemplary arrangement is a partial mesh topology. In a partial mesh topology, each multi-network router 11 is wirelessly connected to some, but not all, of the multi-network routers 11 available within the mesh. Mesh communication network 14 shown in FIG. 2A is the full mesh topology type.

In some embodiments, the data transferred though mesh communication network 14 is limited to small packets of data, such as X and Y positional coordinates between shoppers 7, associates 8, and managers 9. Preferably, the location tracking subsystem is conducted over the mesh communication network 14. In this embodiment, the functionality of the location tracking subsystem uses the information router component of the multi-network router 11. In this embodiment, information routers do not necessarily communicate with each other, but instead provide X and Y positional coordinates to each blind node, which could be a wireless end device 40 or an intelligent shopping cart 50. In selected exemplary embodiments, the wireless end device 40 calculates its own X and Y position through triangulation software loaded onto the wireless end device 40. The wireless end devices 40 receive signals from at least three of the information routers, shown in FIG. 2A as comprised within the multi-network router 11, in order to triangulate the position of the wireless end device 40 or the intelligent shopping cart 50. The multi-network routers 11 are each aware of their X and Y positional coordinates because the logic engine provides each multi-network router with their X and Y positional coordinates. Multi-network routers 11 are connected to the mesh network organizer, shown as multi-network organizer 21, which is connected to the logic engine 23 (shown in FIGS. 1, 2B, and 3A) through an Ethernet cable (system communication line 19 in FIGS. 1, 2B, 3A, 3B, and 4).

In some embodiments, mesh communication network 14 is a ZIGBEE communication network. ZIGBEE is the name of a specification for a suite of high level communication protocols using small, low power digital radios based on the IEEE 802.15.4 standard for wireless personal area networks (WPANs). ZIGBEE is targeted at radio frequency (RF) applications that require a low data rate, long battery life and secure networking.

Referring back to FIG. 2A, in its simplest form, mesh communication network 14 includes one or more multi-network routers 11, at least one multi-network organizer 21, and wireless end devices 40. The multi-network organizer 21 is a device that routes data through one or more of multi-network routers 11 within mesh communication network 14. The multi-network organizer 21 is connected to the logic engine 23 through a system communications line 19. The mesh communication network 14 is either of the beacon or the non-beacon type. In beaconing networks, power use is further minimized because multi-network router 11 only needs to be active while a beacon is being transmitted. Power consumption in non-beacon type networks can be higher since at least some of multi-network routers 11 within communications multi-network 10 are always active, while some others may be inactive. It is possible, though, to have all or substantially all multi-network routers 11 within the communications multi-network 10 continuously active.

In the embodiments where the mesh communication network 14 is a beaconing network, the multi-network routers 11 (and more specifically, the radios for the mesh communication network called the information routers) automatically broadcast multiple times per second their X and Y positional coordinates out to the blind nodes. Blind nodes are selected from the group consisting of wireless end devices 40 and intelligent shopping carts 50. In this embodiment, blind nodes do not have to transmit signals to the multi-network routers 11 asking for their coordinates.

Other embodiments employ a non-beacon type mesh communication network 14. In a non-beacon enabled network (i.e., those whose beacon order is 15), multi-network routers 11 have data receivers that are preferably continuously active. In these embodiments, when asked by wireless end devices 40, mesh network organizer transmits a signal through the one or more multi-network routers 11 back to the blind nodes. Multi-network organizer 21 manages multi-network routers 11, causes association of wireless end devices 40 to the mesh communication network 14, stores information received from multi-network routers 11, and routes messages between multi-network routers 11 and wireless end devices 40 or intelligent shopping carts as 50. The use of a non-beacon type of mesh communication network 14 additionally allows for heterogeneous networks of multiple device types in which some devices receive continuously, while others only transmit when an external stimulus is detected. One example of an element within a heterogeneous network is a lamp having a wireless light switch. The node at the lamp receives constantly, since it is connected to the lamp's power supply while a battery-powered light switch remains "asleep" or inactive until the light switch is thrown. The light switch then activates, sends a command to the lamp, receives an acknowledgment, and returns to a state of inactivation. In a beacon type network, multi-network routers 11 within mesh communication network 14 transmit periodic beacons to confirm their presence to other network nodes. Such nodes sleep between beacons, thus lowering their duty cycle and extending their battery life.

Logic engine 23 or, in alternative embodiments, location tracking server 31, provides several important functions within mesh communication network 14. Important functions provided by the logic engine 23 are those of computation, information storage, organization, response, network notification, data prioritization, event prioritization, ray tracing calculations, creation of historical progressions, creation of heat maps, and others. The logic engine organizes product selection data with shopper location data collected within a predetermined period of time from the wireless end device to create product selection location data. The logic engine also organizes all product selection location data from a single shopping trip to create collective product selection location data, storing each shopper's collective product selection location data in a shopper's electronic profile. This shopper's electronic profile enables the retail establishment to further analyze trends, using the logic engine to create historical progressions for the shopper, either individually or by category. At least one server-grade computer or server is preferred. A server is particularly useful in communications multi-network 10 herein because of its large computational and storage capacities.

Figure 2B:
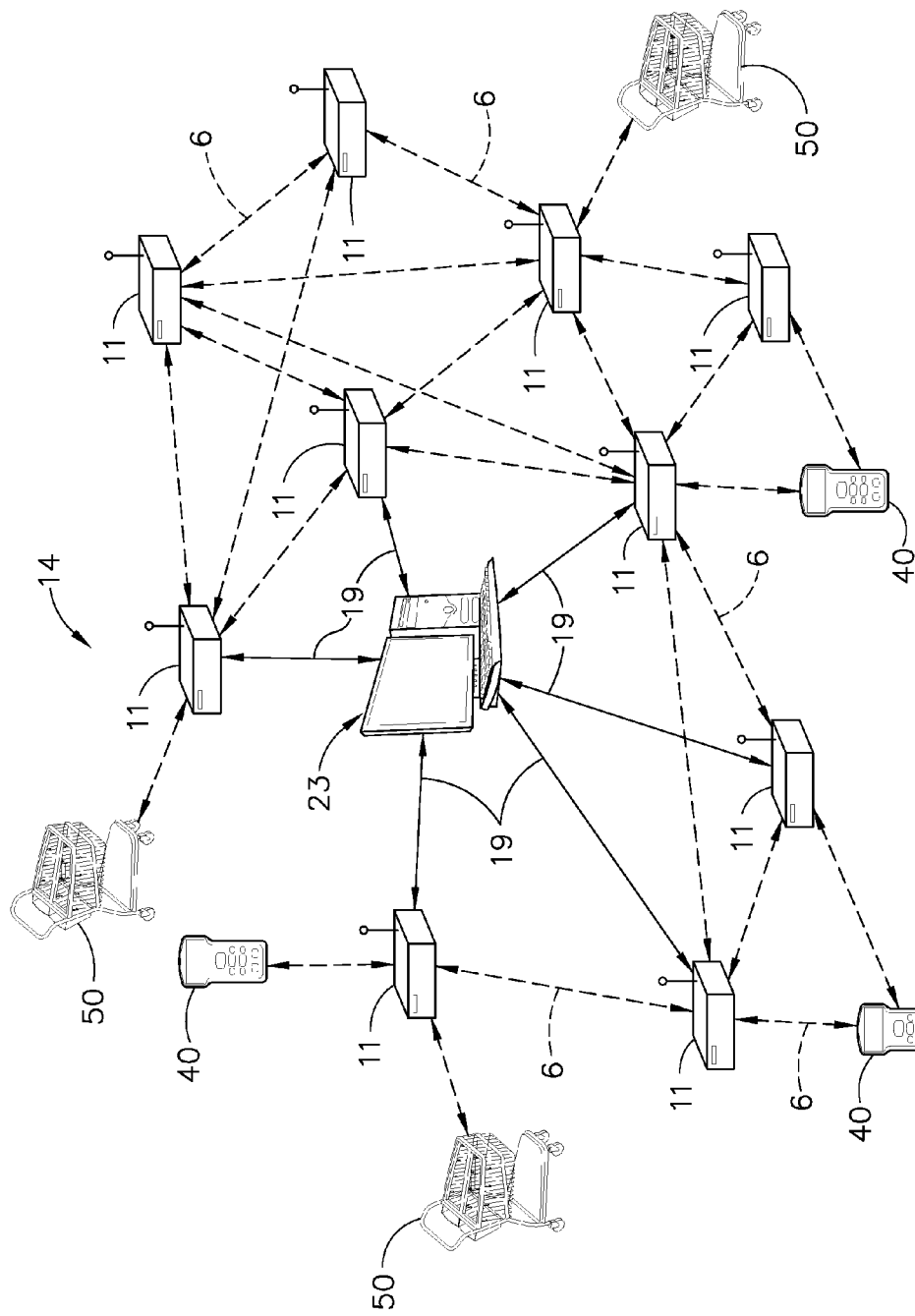

Referring now to FIG. 2B, a schematic representation of the functionality of an exemplary mesh communication network 14 is provided. The mesh communication network 14 transfers data between the members of the mesh communication network 14 such as multi-network routers 11 and wireless end devices 40 to the logic engine 23 through mesh communication lines 6. FIG. 2B shows that there is a dataflow between the logic engine 23 and the wireless end devices 40 and between the logic engine 23 and the intelligent shopping carts 50.

Figure 3A:
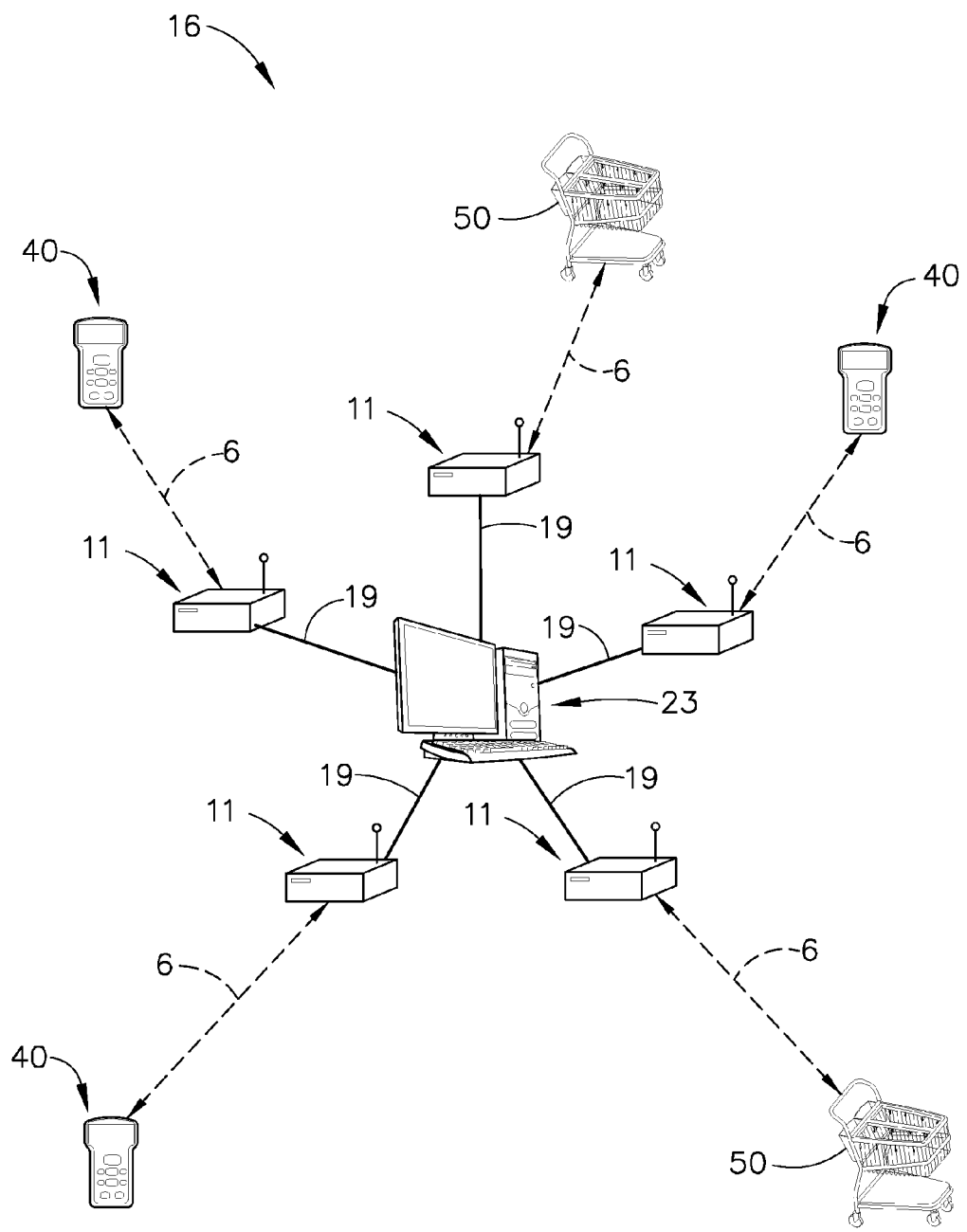
FIG. 3A and FIG. 3B provide a schematic view of an exemplary star communication network useful in a store.

FIG. 3A provides an exemplary representation of a star communication network 16. In FIG. 3A, data communication radios (housed with multi-network routers 11 in FIGS. 3A and 3B), communicate directly with logic engine 23 along system communication lines 19. System communication lines 19 are preferably wired lines that connect the multi-network routers 11 to logic engine 23. For the purposes of explaining the functionality of the star communication network 16, multi-network communication lines 6 are wireless lines of communication between multi-network routers 11 and wireless end devices 40, and are thus depicted as dashed lines. Preferred system communication lines 19 are capable of transferring with high quality and at high speeds digital transmission of voice and other large amounts of data.

A star communication network 16 is particularly useful and important to communications multi-network 10. With its data transmission rate of 250 KB/s or more, star communication network 16 carries data streams that require higher data transmission rates for speed and efficiency. Voice data, pictures, video, and financial transaction data, for example, are data types best suited for transmission at a higher (e.g., 250 KB/s or greater) transmission rate. While these types of information or data can be transmitted through mesh communication network 14, a star communication network 16, either in place of or in addition to mesh communication network 14, is preferred.

An exemplary star communication network 16 herein operates within the IEEE 802 communications protocol. IEEE 802 refers to a family of IEEE standards dealing with local area networks and metropolitan area networks. More specifically, the IEEE 802 standards are restricted to networks carrying variable-size data packets. In contrast, in cell-based networks, data is transmitted in short, uniformly sized units called cells for use within, for example, cell phones. Though preferred, it is acknowledged that star communication network 16 operates within multiple communication protocols including, but not limited to, BLUETOOTH® (telecommunications equipment for a protocol of IEEE 802.15.1 and 802.15.2 registered to Bluetooth Sig, Inc.), WIMEDIA® (specifications for the connection of wireless multimedia devices, commonly known as the IEEE 802.15.3 protocol, which is registered to WiMedia Alliance Corporation), Wi-Fi (IEEE 802.11b), Wi-Fi5 (IEEE 802.11a/HL2), and other wireless protocols like preferred protocol 802.15.4 as noted hereinabove.

In an exemplary embodiment, within IEEE 802, star communication network 16 transmits data within the IEEE 802.15.4 communications protocol. The IEEE 802.15.4 protocol controls transmissions sent through wireless personal area networks (WPANs). WPANs can include the use of BLUETOOTH technology. The IEEE 802.15.4 communications protocol has a low data rate (e.g., about 125 KB/s) and also allows for a long battery life (e.g., battery life for months or even years) in multi-network routers 11 and is known for its very low technical complexity and low power requirements.

Figure 3B:
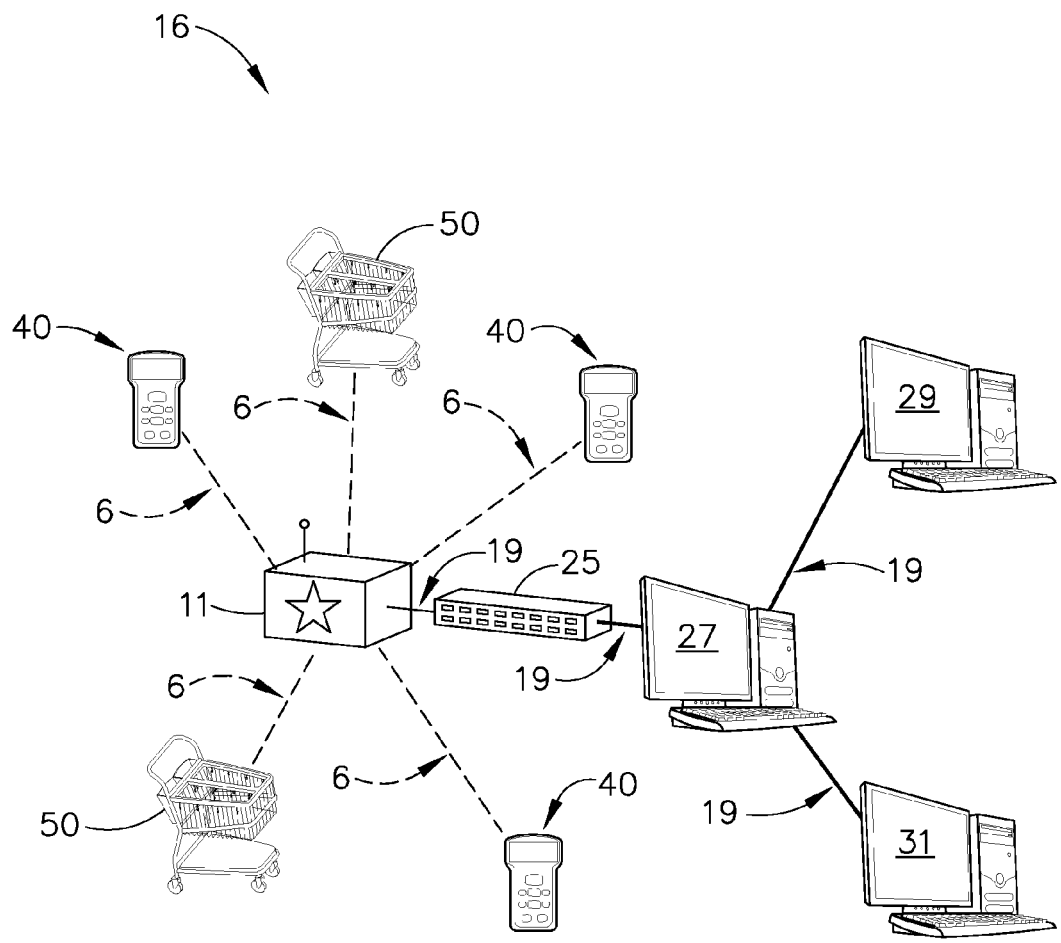

Referring now to FIG. 3B, an exemplary representation of a star communication network 16 is provided. In this embodiment, all substantive communication with the wireless end devices 40 and the intelligent shopping carts 50 is conducted through star communication lines (shown here as multi-network communication lines 6), the data communication radio housed in the multi-network router 11, switch 25 and gateway server 27, and appropriate store server, such as the location tracking server 31. Communication between multi-network router 11 and switch 25 takes place through system communication lines 19, which are either wired or wireless, depending on the specific application contemplated. In some embodiments of the system, system communication lines 19 are wired while multi-network communication lines 6 are wireless. In alternative embodiments, switch 25, gateway server 27, and store servers 29 and the location tracking server 31 are replaced with logic engine 23 (not shown in FIG. 3B).

Figure 4:
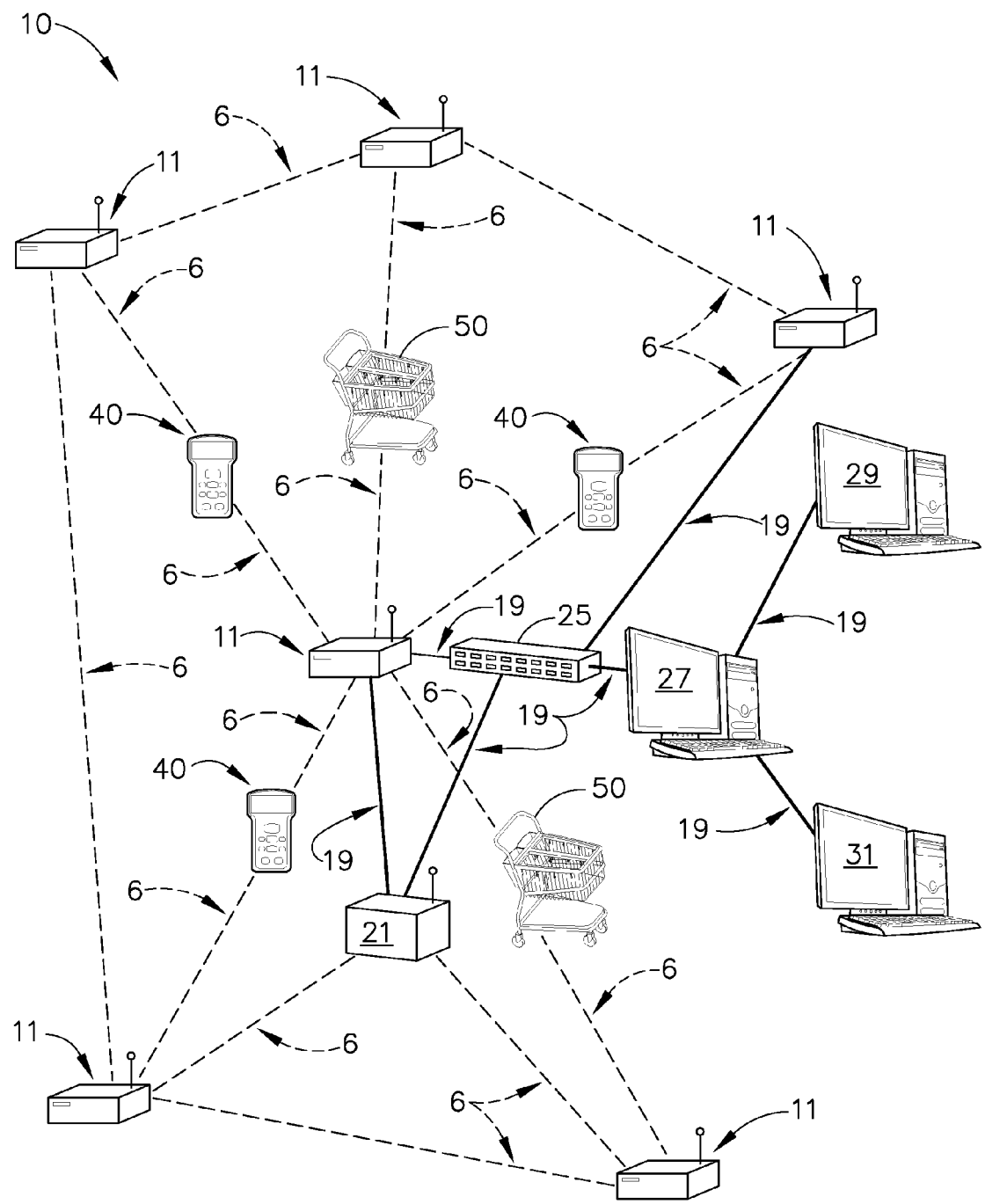
FIG. 4 provides a schematic view of a store providing an exemplary communications multi-network with one star communication network and one mesh communication network useful in a store.

FIG. 4 provides an exemplary representation of a communications multi-network 10. In FIG. 4, multi-network routers 11 provide a signal to wireless end device 40. In an exemplary embodiment, multi-network routers 11 provide wireless end device 40 with the X and Y positional coordinates of multi-network information routers 11. Wireless end device 40 or intelligent shopping cart 50 either performs the calculations necessary to provide its own location in X and Y positional coordinates, or sends a signal out through star communication network 16 to the location tracking server 31. The location tracking server 31 performs the ray tracing and location tracking calculations in some embodiments. In exemplary embodiments, the logic engine 23 performs the location tracking calculations. Under any of the above described embodiments, the location of each wireless end device 40 and intelligent shopping cart 50 is known to the store through the data exchanged between wireless end device 40 and the radio of the information router of the multi-network router 11 of mesh communication network 14.

In embodiments where wireless end device 40 is a reduced function device and either the logic engine 23 or the location tracking server 31 performs the location tracking computations, the radio of the information router in the nearest multi-network router 11 provides the wireless end device 40 with its own X and Y positional coordinates. The radio of the information router in the multi-network router 11 nearest the wireless end device 40 receives the X and Y positional coordinates of wireless end device 40 from the multi-network organizer 21, which receives the X and Y positional coordinates from the location tracking server 31. In any event, the location of wireless end device 40 on the map of retail establishment 5 (shown in FIG. 1) is known to both wireless end device 40 and either the location tracking server 31, or the logic engine 23, through the mesh communication network 14 of communications multi-network 10.

In an exemplary embodiment, with the location of each wireless end device 40 known, wireless end device 40 held by the shopper 7 sends information to and receives information from store associates 8 and managers 9 through star communication network 16. In certain embodiments, the location of each intelligent shopping cart 50 is known, and the intelligent shopping cart 50 used by the shopper 7 sends information to and receives information from associates 8, managers 9, or logic engine 23 through star communication network 16. In some embodiments, all communication between shopper 7 and at least one of the group consisting of associates 8, managers 9, and an intelligent shopping cart 50 must be conducted through multi-network router 11, switch 25 and gateway server 27, and the appropriate store server, such as the location tracking server 31.

Figure 5:
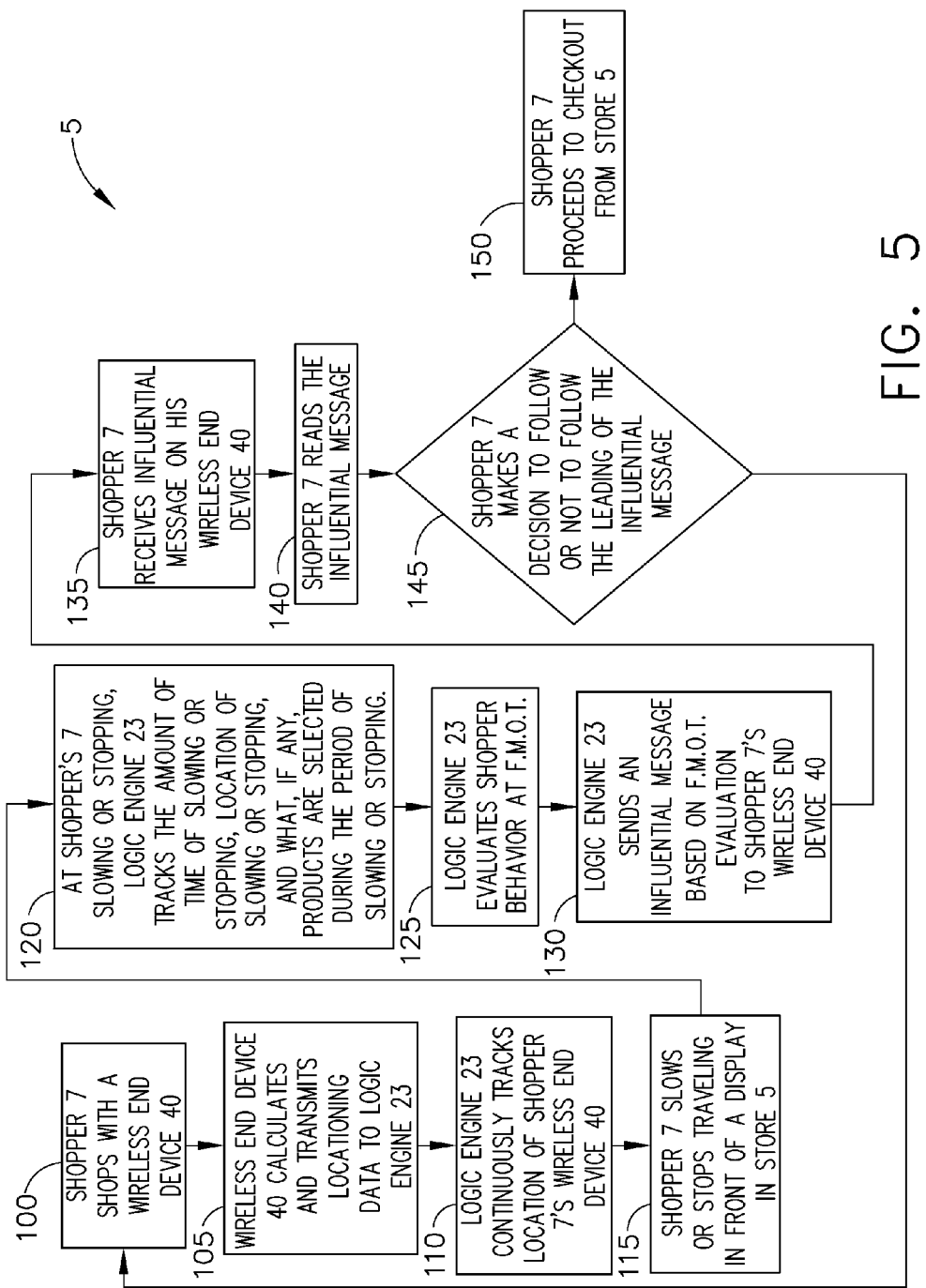
FIG. 5 provides a flowchart of an embodiment of the system and method for calculating, storing and keeping track of the location of the presumed location of a shopper within the store.

In FIG. 5, a flowchart of an exemplary embodiment of the system and method for influencing shopper 7 at the first moment of truth is provided. Generally, the shopper is influenced by messages transmitted to shopper 7's wireless end device 40 through the communications multi-network 10 in retail establishment 5. In Step 100 of FIG. 5, the shopper 7 begins shopping with the wireless end device 40. In most embodiments, when the shopper 7 begins shopping with the wireless end device 40, the shopper 7 scans her preferred shopper card when the wireless end device 40 is assigned to the shopper 7, making retail establishment 5 immediately aware of shopper 7's identity. In Step 105, wireless end device 40, which is held in close proximity to shopper 7 as she shops, continuously calculates and transmits locationing data to logic engine 23. Logic engine 23 receives locationing data from shopper 7's wireless end device 40. In embodiments where wireless end device 40 is a reduced function device, the coordinates of the closest multi-network routers 11 will be transmitted from wireless end device 40 to logic engine 23 where the locationing data will be calculated by logic engine 23.

Step 110 shows that logic engine 23 continuously tracks the location of wireless end device 40 held in close proximity to shopper 7. The use of the word "continuously" as used herein is defined as the increment determined by the software operator. For instance, the interval of time can be, but is not limited to, every 3 seconds, every 5 seconds, or every 10 seconds. The interval will vary, depending on the specific application contemplated.

Then, as shown in Step 115, shopper 7 slows or stops traveling through the store in front of products and experiences a first moment of truth. Logic engine 23 is programmed with software that recognizes when shopper 7 is experiencing a first moment of truth when shopper's speed slows to a certain speed or when the shopper 7 stops in front of a display for a certain period of time, e.g. three seconds. At Step 120, when shopper 7 slows or stops her travel through the retail establishment 5 in front of products, logic engine 23 tracks the amount of time the shopper 7 slows or stops, the location of the slowing or stopping, and the identity of the products selected by shopper (if any are selected at all) during the period of the slowing or the stopping of travel throughout retail establishment 5. In Step 125, logic engine 23 evaluates the information collected during step 120 to determine whether shopper 7 is experiencing a first moment of truth. To determine a first moment of truth, the logic engine 23 compares the tracked location of the shopper 7 (also known as shopper location data) to the product location map to produce a shopper to product location ratio. When the product to location ratio is under about five feet, the logic engine 23 begins timing the amount of time that the shopper 7 is in close proximity to the product. When shopper 7 selects the product and scans it with her wireless scanning device, creating product selection data, the logic engine 23 stops timing using the difference between the time of day when the shopper 7 selected the product and the first moment the product location ratio was under about five feet. The logic engine 23 evaluates the intended product purchase of the shopper, the shopper to product location ratio, and the product selection timing data to produce an evaluation data. The logic engine determines if the evaluation data indicates a first moment of truth.

In Step 130, if it is determined that the shopper 7 is experiencing a first moment of truth based upon the evaluation data, then logic engine 23 transmits to shopper 7, via her wireless end device 40, an influential message based on the first moment of truth evaluation. In Step 135, shopper 7 receives the influential message on her wireless end device 40. Ideally, while experiencing a first moment of truth, shopper 7 reads the influential message on her wireless end device 40 as shown in Step 140. Non-ideally, shopper 7 can read the one or more influential messages on this wireless end device 40 when not experiencing a first moment of truth.

At this point in time, in Step 145, shopper 7 makes a decision either to follow or not to follow the leading of the influential message. For instance, when the influential message recommends a substitute product for the one scanned by shopper, at Step 145 shopper 7 decides to purchase the item the influential message recommended. In other embodiments, the shopper 7 is influenced by the influential message to purchase a different quantity of products than shopper 7 originally contemplated at her first moment of truth. In still other embodiments, the shopper 7 decides to purchase a different product than the product selected and scanned, returning the original product to the shelf and scanning the suggested product. After shopper's decision in Step 145, shopper 7 either continues to shop (returning to Step 100) or proceeds to check out the items already selected (Step 150).

Figure 6:
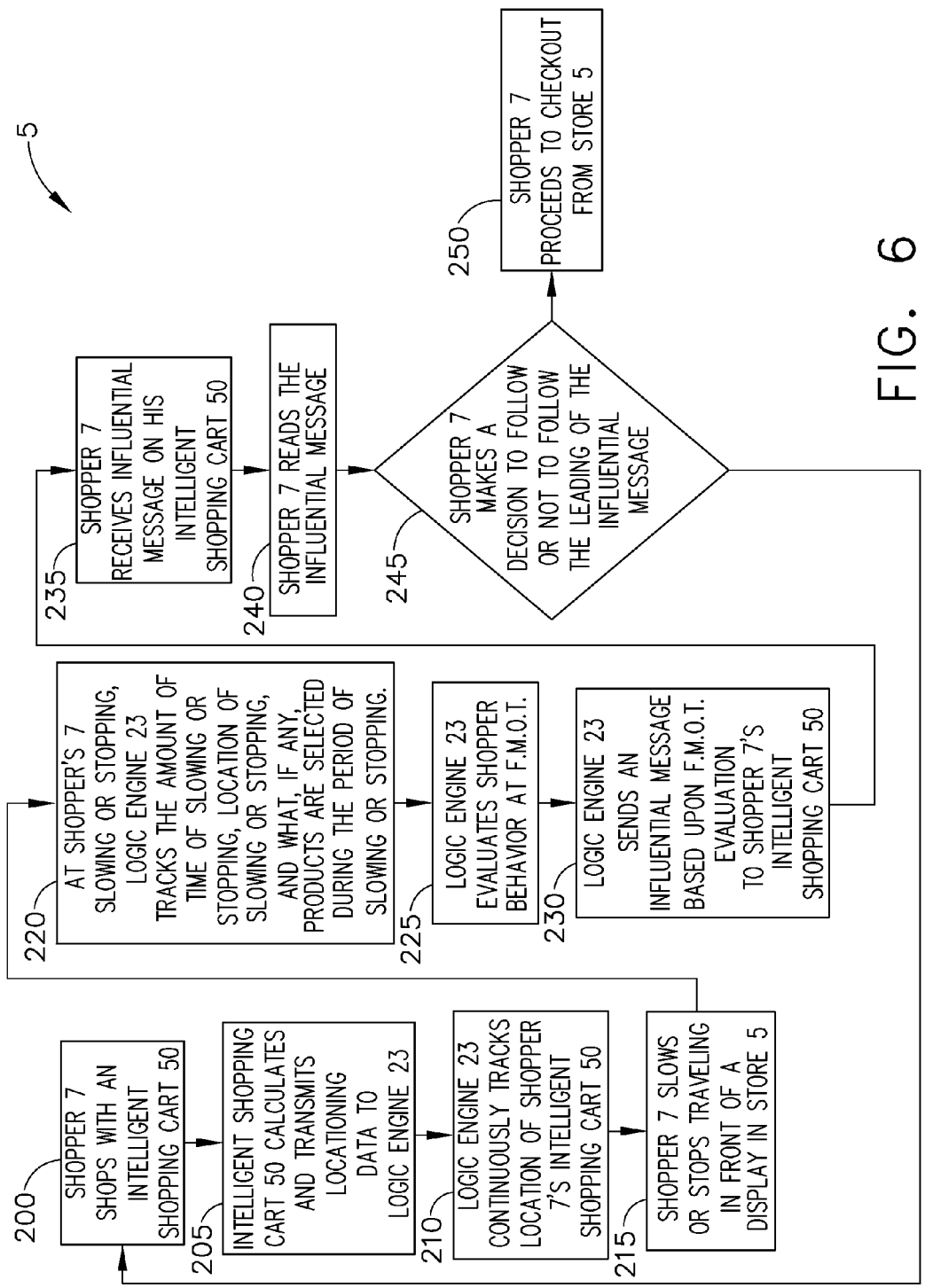
FIG. 6 provides a flowchart of an alternative embodiment of the system and method for calculating, storing and keeping track of the location of the presumed location of a shopper within the store.

FIG. 6 provides a flowchart of one embodiment of the system and method for influencing shopper 7 at the first moment of truth by transmitting messages to shopper 7's intelligent shopping cart 50 through a communications multi-network 10 in retail establishment 5. In Step 200 of FIG. 6, shopper 7 begins shopping with intelligent shopping cart 50. In most embodiments, when shopper 7 begins shopping with intelligent shopping cart 50, shopper 7 scans her preferred shopper card when the intelligent shopping cart 50 (and incorporated wireless end device) is assigned to shopper 7, making retail establishment 5 immediately aware of shopper 7's identity. In Step 205, intelligent shopping cart 50, which is in close proximity to shopper 7 as she shops, continuously calculates and transmits locationing data to logic engine 23. Logic engine 23 receives locationing data from shopper 7's intelligent shopping cart 50. In embodiments where intelligent shopping cart 50 includes a wireless end device which is a reduced function device, the coordinates of the closest multi-network routers 11 will be transmitted from intelligent shopping cart 50 to logic engine 23 where the locationing data will be calculated by logic engine 23.

Step 210 shows that logic engine 23 continuously tracks the location of intelligent shopping cart 50 in close proximity to shopper 7. The use of the word "continuously" as used herein is defined as the increment determined by the software operator. For instance, the interval of time can be, but is not limited to, every 3 seconds, every 5 seconds, or every 10 seconds. The interval can vary depending on the specific application contemplated.

Then, as shown in Step 215, shopper 7 slows or stops traveling through the store in front of products and experiences a first moment of truth. Logic engine 23 is programmed with software that recognizes when shopper 7 is experiencing a first moment of truth when shopper's speed slows to a certain speed or when a shopper stops in front of a display for a certain period of time, e.g. three seconds. At Step 220, when shopper 7 slows or stops in front of products, logic engine 23 tracks the amount of time of slowing or stopping, the location of the slowing or stopping, and the identity of the products selected by shopper (if any are selected at all) during the period of the slowing or the stopping of travel throughout retail establishment 5. In Step 225, logic engine 23 evaluates the information collected during step 220 to determine whether shopper 7 is experiencing a first moment of truth. To determine a first moment of truth, the logic engine 23 compares the shopper location data to the product location map to produce a shopper to product location ratio. When the product to location ratio is under about five feet, the logic engine 23 begins timing the amount of time that the shopper 7 is in close proximity to the product. When shopper 7 selects the product and scans it with her wireless scanning device, thereby creating product selection data, the logic engine 23 stops timing using the difference between the time of day when the shopper 7 selected the product and the first moment the product location ratio was under about five feet. The logic engine 23 evaluates the intended product purchase of the shopper, the shopper to product location ratio, and the product selection timing data to produce an evaluation data. The logic engine determines whether the evaluation data indicates a first moment of truth.

In Step 230, if it is determined that the shopper 7 is experiencing a first moment of truth based on the evaluation data, logic engine 23 transmits to shopper 7, via her intelligent shopping cart 50, an influential message based on the first moment of truth evaluation. In Step 235, shopper 7 receives the influential message on her intelligent shopping cart 50. Ideally, while experiencing a first moment of truth, shopper 7 reads the influential message on her intelligent shopping cart 50 as shown in Step 240. Non-ideally, shopper 7 reads one or more influential messages on this intelligent shopping cart 50 when not experiencing a first moment of truth.

At this point in time, in Step 245, shopper 7 makes a decision either to follow or not to follow the leading of the influential message. For instance, when the influential message recommends a substitute product for the one scanned by shopper, at Step 245 shopper 7 decides to purchase the item the influential message recommended. In other embodiments, the shopper 7 is influenced by the influential message to purchase a different quantity of products than shopper 7 originally contemplated at her first moment of truth. In still other embodiments, the shopper 7 decides to purchase a different product than the product selected and scanned, returning the original product to the shelf and scanning the suggested product. After shopper's decision in Step 245, shopper 7 either continues to shop (returning to Step 200) or proceeds to check out the items already selected (Step 250).

FIG. 7 provides a frontal view of a wireless end device 40 with multiple interface keys 42. Wireless end devices 40 are used by at least one of the following: a manager, a store associate, and a shopper. In some embodiments, a location tracking device is housed within each wireless end device 40. Wireless end device 40 is battery powered and is preferably re-chargeable. It has the ability to seek out and associate itself (i.e. attach itself wirelessly) to an existing communications multi-network 10 herein. Wireless end device 40 herein is either a reduced function device or a full function device, but a reduced function device is preferred for its lower power consumption. In some embodiments, wireless end device 40 includes a product scanning device (not shown) and an imager useful for scanning items by shopper 7 for placement of the scanned items into a shopping cart (intelligent 50 or non-intelligent; not shown) and for taking photographs.

The wireless end device 40 serves substantially as a device that receives information from and transmits information to communications multi-network 10. In FIG. 7, wireless end device 40 is shown including interface keys 42. While each multiple interface key 42 denotes a function that occurs, most of the multiple interface keys 42 actually provide a requested transmission to or from other devices attached to the communications multi-network 10 (not shown) rather than requiring the wireless end device 40 to perform computational functions. In some embodiments, wireless end device 40 transmits information to other devices attached to the multi-network 10, such as the logic engine 23 or other devices capable of performing computational functions, for computation. Computational functions include, but are not limited to, ray tracing calculations, price calculations, and budget calculations. Therefore, the interface keys 42 shown on wireless end device 40 in FIG. 7 are not meant to imply the actuation of a function within wireless end device 40 other than the receipt or transmission of information from communications multi-network 10 and whatever key types are used on the wireless end device 40 result in very little, or even no, computation, because logic engine 23 or location tracking server 31 performs the ray tracing calculations. By this use of interface keys 42, necessary hardware for computation functions like the calculating of its X and Y positional coordinates on the store grid is alleviated.

For example, wireless end device 40 does not itself substantially compute or keep a running total of the cost of items previously scanned and placed into intelligent shopping cart 50. Instead, cart key 44, when depressed, signals to communications multi-network 10 that wireless end device 40 is ready to scan an item that is to be placed into shopping cart 50 after the item has been scanned. Information on the item scanned is transmitted wirelessly through communications multi-network 10 and ultimately routed to logic engine 23 or location tracking server 31 for storage and/or further processing.

It should be noted herein that FIG. 7 is exemplary and the types, configurations, and orientation of the buttons shown form no part of the invention. A myriad of key types, sizes, shapes, configurations, symbols, graphics, etc. can be created to fit within the scope and purpose of wireless end device 40 depending on the specific application contemplated.

When wireless end device 40 is configured to do little or no computation, wireless end device 40 is extremely cost effective to build and put into use. Since lower priced components are used (i.e., high speed processor and memory) wireless end device 40 is subject to less theft. Furthermore, even if theft of the wireless end device 40 does occur, its replacement cost is much less than the per-unit costs of more complex devices. When wireless end device 40 lacks a high speed processor and memory, it also lacks the significant amount of software of other devices that depend upon high speed processors and large sophisticated memory types. Additionally, because of the low per-unit cost of wireless end device 40, more units can be deployed to a greater number of shoppers of retail establishment 5. Wireless end device 40 can also be used in multiple grocery stores, so long as each store possesses a compatible communications multi-network 10 usable by wireless end device 40.

In other embodiments, wireless end device 40 performs certain complex computational functions, at least partially, within its circuitry, i.e., within its microcontrollers. For example, it performs the ray tracing calculations to determine its own location on the two dimensional grid superimposed on the map of the store. In this embodiment, it is preferred, but not necessary, that logic engine 23 or the appropriate store server, such as location tracking server 31, acts as a back-up to a full function wireless end device 40 in the case of a computational or other type of outage in wireless end device 40.

Wireless end device 40, whether or not it has computational capabilities, comprises at least one MCU. The MCU herein is preferably a system-on-a-chip type of MCU. The MCU herein comprises a control unit, one or more registers, an amount of read only memory (ROM), an amount of random access memory (RAM), and an arithmetic logic unit (ALU). In embodiments where the wireless end device 40 does not perform all of the computational work, the ALU will be accessed very little, if at all, for any calculations within wireless end device 40. In embodiments of wireless end device 40 where the device itself performs the majority of the computational work, the ALU will be accessed, and therefore used, for computations.

In some embodiments, wireless end device 40 includes at least two MCUs. One MCU receives and transmits information from wireless end device 40 to the mesh communication network 14. Another MCU receives and transmits information from wireless end device 40 to the star communication network 16. The Texas Instruments CC2431 MCU is preferred herein because of its ability to transmit data for both mesh communication network 14 and star communication network 16. Also, the CC2431 MCU provides location detection functions within communications multi-network 10 herein. Such location detection is an important, preferred function because it allows any device so equipped (whether wireless end devices 40, intelligent shopping cart 50, or multi-network routers 11) to be found and located anywhere within communications multi-network 10.

The technical specifications for the CC2431 MCU are the following: 32 MHz single-cycle low power 8051 MCU; 2.4 GHz IEEE 802.15.4 compliant RF transceiver; 128 KB in-system programmable flash; ultra low power requirements; ZIGBEE protocol stack (Z-STACK) operable; and 8 Kbyte SRAM, 4 Kbyte with data retention in all power modes. The CC2431 is a true system-on-chip (SOC) for wireless sensor networking ZIGBEE/IEEE 802.15.4 solutions. The CC2431 includes a location detection hardware module that can be used to locate either wireless end device 40 or an intelligent shopping cart 50 within communications multi-network 10. Based on this, the location engine calculates an estimate of an unknown wireless end device's 40 or intelligent shopping cart's 50 position within communications multi-network 10.

In addition to the MCUs used for information flow and management along mesh communication network 14 and star communication network 16, at least one governing MCU is employed within wireless end device 40. This governing MCU governs, evaluates, sends messages to, receives information from, and manages the other MCUs configured to send and receive information along mesh communication network 14 and star communication network 16. The MSP430 built by Texas Instruments is a preferred model for a governing MCU. The MSP430 is a microcontroller built around a 16-bit processor that is designed for low cost and low power consumption embedded applications. It is particularly well suited for wireless radio frequency (RF) or battery powered applications. The current draw in idle mode can be less than 1 microampere. Its top processor speed is 16 MHz. It can be throttled back for lower power consumption. The MSP430 does not have an external memory bus. It is therefore limited to on-chip memory and preferably comprises up to 128 KB flash memory and 10 KB RAM.

In embodiments in which communications multi-network 10 contains multiple star communication networks 16, an exemplary configuration of the internal hardware of wireless end device 40 includes two MCUs responsible for communication with communications multi-network 10 and a governing MCU that governs all other needful functions within wireless end device 40. In this configuration, one of the two MCUs is always associated with and wirelessly connected to communications multi-network 10. The other MCU, when it is not wirelessly connected to communications multi-network 10, searches for the strongest radio signal transmitted by communications multi-network 10 to connect to the communications multi-network 10. If a signal sensed by the un-associated MCU becomes stronger than a signal transmitted by the currently associated star communication network 16, the un-associated MCU will convert to associated status and the formerly associated MCU will convert to un-associated status and then begin to seek the strongest radio signal available from communications multi-network 10. Such process of association and un-association between the MCUs occurs continually as shopper 7 moves about a store and moves from one star communication network 16 to another star communication network 16 located within retail establishment 5.

In alternative embodiments in which communications multi-network 10 comprises multiple star communication networks 16 and no mesh communication networks 14, two MCUs (preferably Texas Instruments CC2431) responsible for simultaneous receipt and transmission of information from wireless end device 40 are both associated with communications multi-network 10. Such a dual association enables the transmission of larger packets of data from or to wireless end device 40. These larger packets of data may include voice data, video, and other data types whose wireless transmission (i.e., between wireless end device 40 and communications multi-network 10) is best facilitated by a 256 KB/s transmission rate or higher.

Referring now to FIG. 8, an exemplary intelligent shopping cart 50 used by a shopper 7 in retail establishment 5 is provided. In appearance, intelligent shopping cart 50 looks like most known conventional shopping carts. The intelligent shopping cart 50 has a handle 52, a basket 54 attached to the handle 52, and an under carriage 56 positioned below basket 54. However, intelligent shopping cart 50 is "intelligent" because it is in communication with retail establishment 5 through the communications multi-network 10. When intelligent shopping cart 50 is equipped with MCUs (preferably Texas Instruments CC2431), it is responsible for receipt and transmission of information with logic engine 23 through communications multi-network 10. Furthermore, when intelligent shopping cart 50 either houses an imager and a screen, or is paired with a wireless end device 40 that houses an imager and a screen, shopper 7 can read influential messages received from logic engine 23. In some embodiments, intelligent shopping cart 50 includes a tracking device so that retail establishment 5 can track the location of intelligent shopping cart 50 throughout retail establishment 5.

As shown in FIG. 8, intelligent shopping cart 50 also includes weighing devices 58 positioned within the interior surface 55 of the basket 54. In some embodiments, weighing devices 58 are in the form of hooks 60. Each weighing device 50, or hook 60, is connected to a strain gauge (not shown) which measures the deformation or strain of an object upon which it is placed. The strain gauge measures the deformation of the hook 60 when an item is placed thereon causing a measurable deformation. The measurable deformation is a measure of at least a portion of the weight of an item applied to the hook 60.

While various embodiments of the present invention have been described above, it should be understood that they have been presented by way of example, and not limitation. It will be apparent to persons skilled in the relevant art(s) that various changes in form and detail can be made therein without departing from the scope of the present invention. Thus, embodiments of the present invention should not be limited by any of the above described exemplary embodiments, but should be defined only in accordance with the following claims and their equivalents.

What is claimed is:

1. A method of influencing a shopper's product selection during a shopper's shopping trip in a retail establishment, said method comprising the steps of:
   i. Positioning a communications multi-network for shopper communication in a retail establishment, the communications multi-network comprising at least one mesh communication network and at least one star communication network, said mesh communication network and said star communication networking operating within said communications multi-network to produce tracking data and product selection data;
   ii. Providing a logic engine, said logic engine being in operative connection with said communications multi-network and managing said communications multi-network;
   iii. Tracking a wireless end device, the wireless end device being held in close proximity to said shopper during said shopper's shopping trip in said retail establishment, wherein the wireless end device is in tracked communication with said logic engine through said mesh communication network of said communications multi-network;
   iv. Electronically associating said wireless end device to said communications multi-network;
   v. Identifying a product on display in said retail establishment, said product being in close proximity to said shopper;
   vi. Determining a suitable influential message to transmit to said wireless end device held in close proximity to said shopper from said logic engine; and
   vii. Transmitting from said logic engine said suitable influential message through said star communication network to said wireless end device held in close proximity to said shopper during said shopper's shopping trip in said retail establishment.

2. The method of claim 1 further comprising the step of providing a multi-network router positioned about said retail establishment, said multi-network router being communicatively coupled to the communications multi-network.

3. The method of claim 1 wherein said communications multi-network comprises a first mesh communication network and a second mesh communication network.

4. The method of claim 1 wherein said communications multi-network comprises a first star communication network and a second star communication network.

5. The method of claim 1 wherein said suitable influential message is selected from the group consisting of a competitive saving opportunity, a co-branding opportunity, a product warning, a product combination warning, a product review, a response to a historical progression, an alternative choice for product purchase, in-store directions to locate a product, an electronic coupon, price cut alerts, price increase alerts, and budget limit alerts.

6. The method of claim 1 wherein said wireless end device is in association with an intelligent shopping cart.

7. The method of claim 1 further comprising the steps of:
   i. Coupling a product scanning device to said wireless end device;
   ii. Scanning a product for purchase using said product scanning device, said product for purchase having a product identity;
   iii. Creating a product scanning data by recording the identity of said product for purchase;
   iv. Transmitting said product scanning data to said logic engine; and
   v. Evaluating said product scanning data, wherein the logic engine evaluates the product scanning data.

8. The method of claim 7 wherein said wireless end device comprises a tracking location device which is in tracked communication with said logic engine, wherein the step of tracking said wireless end device further comprises the step of producing a tracked location of said shopper in said retail establishment, whereby said logic engine produces said tracked location.

9. The method of claim 8 further comprising the step of comparing said tracked location to a product location map to produce a shopper to product location ratio, wherein said logic engine compares said tracked location to said product location map.

10. The method of claim 9 further comprising the steps of:
    i. Recording the time when said shopper to product location ratio is under about five feet; and
    ii. Calculating a product selection timing data by calculating the difference between the time said product selection data was created and the time said shopper to product location ratio is under about five feet, wherein the steps of recording the time and calculating the product selection timing data are performed by said logic engine.

11. The method of claim 10 further comprising the step of producing evaluation data, said evaluation data being the result of said logic engine evaluating said intended product purchase, said shopper to product location ratio, and said product selection timing data.

12. The method of claim 11 further comprising the step of determining a first moment of truth, said first moment of truth being indicated by said evaluation data to said logic engine.

13. The method of claim 12 further comprising the step of tailoring said suitable influential message to said evaluation data when said first moment of truth is determined.

14. The method of claim 1 wherein said influencing of said shopper's product selection occurs prior to said shopper's product selection.

15. The method of claim 14 wherein said influencing of said shopper's product selection causes said shopper's product selection to be altered.

16. The method of claim 1 wherein said influencing of said shopper's product selection occurs during said shopper's product selection.

17. The method of claim 16 wherein said influencing of said shopper's product selection causes said shopper's product selection to be altered.

18. The method of claim 1 wherein said influencing of said shopper's product selection occurs after said shopper's product selection.

19. The method of claim 18 wherein said influencing of said shopper's product selection causes said shopper's product selection to be altered.

* * * * *

UNITED STATES PATENT AND TRADEMARK OFFICE
CERTIFICATE OF CORRECTION

PATENT NO. : 7,792,710 B2  
APPLICATION NO. : 12/609246  
DATED : September 7, 2010  
INVENTOR(S) : Brett Bracewell Bonner et al.

Page 1 of 1

It is certified that error appears in the above-identified patent and that said Letters Patent is hereby corrected as shown below:

Column 2, line 58, after "about" insert -- the --;
Column 5, line 2, delete "include" and insert therefor -- included --;
Column 5, line 43, delete "are";
Column 5, lines 61-63, delete ", with which the wireless end device, held in close proximity to the shopper." and insert therefor -- . --;
Column 6, line 13, after "types" insert -- of --;
Column 7, line 38, after "herein" delete "refers to as used herein";
Column 9, lines 11-12, after "node" insert -- , --;
Column 9, line 16, delete "15";
Column 11, line 6, after "create" delete "an" insert therefor -- a --;
Column 11, line 42, delete "e.g." and insert therefor -- e.g., --;
Column 14, line 56, delete "cards" and insert therefor -- card --;
Column 20, line 34, delete "multi-network router 11" and insert therefor -- wireless end device 40 --;
Column 20, line 37, delete "multi-network routers 11" and insert therefor -- wireless end devices 40 --;
Column 20, line 40, delete "multi-network routers 11" and insert therefor -- wireless end devices 40 --;
Column 20, line 64, delete "as";
Column 21, line 9, delete "multi-network routers 11" and insert therefor -- wireless end devices 40 --;
Column 24, line 3, delete "e.g." and insert therefor -- e.g., --;
Column 25, line 23, delete "e.g." and insert therefor -- e.g., --; and
Column 26, line 14, delete "i.e." and insert therefor -- i.e., --.

Signed and Sealed this  
Fifteenth Day of March, 2011

David J. Kappos  
*Director of the United States Patent and Trademark Office*